US009528523B2

(12) United States Patent
Cummings

(10) Patent No.: US 9,528,523 B2
(45) Date of Patent: *Dec. 27, 2016

(54) TEST AND MONITORING SYSTEM FOR A SUMP PUMP INSTALLATION HAVING A VARIABLE TEST CYCLE TIME OUT

(71) Applicant: Beacon Technical Systems, LLC, Pullman, WA (US)

(72) Inventor: Eugene M. Cummings, Lake Forest, IL (US)

(73) Assignee: Beacon Technical Systems, LLC, Pullman, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/491,263

(22) Filed: Sep. 19, 2014

(65) Prior Publication Data

US 2015/0143895 A1 May 28, 2015

Related U.S. Application Data

(63) Continuation-in-part of application No. 29/486,504, filed on Mar. 31, 2014, now Pat. No. Des. 741,815, and (Continued)

(51) Int. Cl.
F04D 15/00 (2006.01)
F04D 13/08 (2006.01)
(Continued)

(52) U.S. Cl.
CPC ......... *F04D 15/0088* (2013.01); *F04D 13/086* (2013.01); *F04D 13/12* (2013.01);
(Continued)

(58) Field of Classification Search
CPC .... F04D 15/0088; F04D 13/086; F04D 13/12; F04D 15/0005; F04D 15/0227; F04D 13/14; F16K 37/0075; F04B 51/00; G01F 23/74
(Continued)

(56) References Cited

U.S. PATENT DOCUMENTS 4,186,419 A 1/1980 Sims
4,222,711 A 9/1980 Meyer
(Continued)

OTHER PUBLICATIONS

Web Page, Protector, The Protector Control, http://www.floodnot.com/products_icontrol_battery_sump_pump.html, Copyright 1998-2012 Basement Flood Protector, (2 pages).
(Continued)

*Primary Examiner* — Lisa Caputo
*Assistant Examiner* — Nathaniel T Woodward

(57) ABSTRACT

An automated system for monitoring and testing a sump pump installation includes an electrically-actuated valve which admits liquid into the liquid container in response to a valve control signal. A test control module supplies a valve control signal to initiate a test cycle during which liquid is admitted to the container to cause the liquid level in the container to rise after which the pump, if functional, discharges liquid from the container and the test cycle is terminated. The test control module includes a timer circuit which, if the test cycle is not terminated by the pump, terminates the test cycle and terminates application of the valve control signal to the valve after a predetermined time out period following initiation of the test cycle. The test control module further includes an indicator circuit which indicates upon termination of the test cycle whether the test was successful or unsuccessful. In one embodiment the timeout period of the test cycle is dependent on the flow rate of liquid through the conduit.

6 Claims, 28 Drawing Sheets

Related U.S. Application Data a continuation-in-part of application No. 14/281,525, filed on May 19, 2014.

(60) Provisional application No. 61/908,881, filed on Nov. 26, 2013.

(51) Int. Cl.
  *F04D 13/12* (2006.01)
  *F04D 15/02* (2006.01)
  *G01F 23/74* (2006.01)

(52) U.S. Cl.
  CPC ..... *F04D 15/0005* (2013.01); *F04D 15/0227* (2013.01); *G01F 23/74* (2013.01)

(58) Field of Classification Search
  USPC .......................................................... 73/168
  See application file for complete search history.

(56) References Cited

U.S. PATENT DOCUMENTS

| | | | |
|---|---|---|---|
| 4,805,066 A | 2/1989 | Mergenthaler | |
| 5,216,288 A | 6/1993 | Greene | |
| 5,234,319 A | 8/1993 | Wilder | |
| D358,560 S | 5/1995 | George | |
| 5,549,456 A | 8/1996 | Burrill et al. | |
| 5,640,995 A | 6/1997 | Packard | |
| 5,672,050 A | 9/1997 | Webber et al. | |
| D388,055 S | 12/1997 | Mariotta | |
| 5,793,294 A | 8/1998 | Schepka | |
| D399,493 S | 10/1998 | Nakajima | |
| 5,967,759 A * | 10/1999 | Jurado | E03F 3/00 417/36 |
| 6,005,483 A | 12/1999 | West | |
| D442,560 S | 5/2001 | Price | |
| 6,257,833 B1 | 7/2001 | Bates | |
| 6,322,325 B1 | 11/2001 | Betlehradek | |
| 6,366,053 B1 | 4/2002 | Belehradek | |
| 6,565,325 B2 | 5/2003 | Belehradek | |
| 6,631,097 B2 | 10/2003 | Su | |
| 6,676,382 B2 | 1/2004 | Leighton et al. | |
| 7,015,819 B2 | 3/2006 | Collings | |
| 7,307,538 B2 | 12/2007 | Kochan, Jr. | |
| 7,309,216 B1 | 12/2007 | Spadola, Jr. et al. | |
| 7,373,817 B2 | 5/2008 | Burdi et al. | |
| 7,429,842 B2 | 9/2008 | Schulman | |
| 7,458,782 B1 | 12/2008 | Spadola, Jr. et al. | |
| 7,612,529 B2 | 11/2009 | Kochan, Jr. | |
| D618,186 S | 6/2010 | Solow | |
| 7,830,268 B1 | 11/2010 | MacDonald | |
| 7,880,625 B2 | 2/2011 | Almoumen | |
| 7,931,447 B2 | 4/2011 | Levin | |
| D642,083 S | 7/2011 | Blanc | |
| 8,130,107 B2 | 3/2012 | Meyer | |
| 8,149,122 B2 | 4/2012 | Burza | |
| 8,180,496 B2 | 5/2012 | Scoleri et al. | |
| 8,186,975 B2 | 5/2012 | Kochan, Jr. | |
| D663,746 S | 7/2012 | Kwon | |
| 8,226,371 B2 | 7/2012 | Kochan | |
| 8,297,937 B2 | 10/2012 | Johnson | |
| 8,429,967 B2 | 4/2013 | Kim et al. | |
| 8,436,559 B2 | 5/2013 | Kidd | |
| 8,579,600 B2 | 11/2013 | Vijayakumar | |
| 8,591,198 B2 | 11/2013 | Kochan, Jr. et al. | |
| D710,901 S | 8/2014 | Brokenshire | |
| D712,435 S | 9/2014 | Kodera | |
| 8,907,789 B2 | 12/2014 | Kochan | |
| 9,051,930 B2 | 6/2015 | Stiles, Jr. | |
| D740,698 S | 10/2015 | Cummings | |
| D741,815 S | 10/2015 | Cummings | |
| 9,157,434 B2 | 10/2015 | Leonard | |
| 2002/0047783 A1 | 4/2002 | Bergum et al. | |
| 2002/0069916 A1 | 6/2002 | Ferguson et al. | |
| 2002/0102162 A1 | 8/2002 | Belehradek | |
| 2002/0117214 A1 | 8/2002 | Tucker et al. | |
| 2003/0171895 A1 | 9/2003 | Harris | |
| 2004/0011194 A1 | 1/2004 | Lederer | |
| 2004/0035465 A1 | 2/2004 | Cazden | |
| 2004/0055363 A1 | 3/2004 | Bristol | |
| 2004/0255977 A1 | 12/2004 | Slocum et al. | |
| 2006/0235573 A1 | 10/2006 | Guion | |
| 2006/0277980 A1 * | 12/2006 | Kristiansen | G01N 15/0893 73/73 |
| 2007/0078610 A1 | 4/2007 | Adams | |
| 2007/0258827 A1 | 11/2007 | Gierke | |
| 2008/0031752 A1 * | 2/2008 | Littwin | F04D 15/0072 417/411 |
| 2009/0162211 A1 | 6/2009 | Kochan, Jr. et al. | |
| 2009/0208345 A1 | 8/2009 | Moore et al. | |
| 2010/0111724 A1 | 5/2010 | Chou | |
| 2010/0119379 A1 | 5/2010 | Becker | |
| 2011/0077875 A1 | 3/2011 | Tran et al. | |
| 2011/0273288 A1 * | 11/2011 | Kochan, Jr. | F04B 41/06 340/540 |
| 2011/0311370 A1 | 12/2011 | Sloss et al. | |
| 2012/0199220 A1 | 8/2012 | Knepp et al. | |
| 2012/0230852 A1 | 9/2012 | Andersen | |
| 2013/0197700 A1 | 8/2013 | Kochan, Jr. et al. | |
| 2013/0294931 A1 | 11/2013 | Magnusson | |
| 2014/0039836 A1 | 2/2014 | Moricca | |
| 2014/0100526 A1 | 4/2014 | Ueda | |
| 2014/0202243 A1 | 7/2014 | Leonard | |
| 2014/0250580 A1 | 9/2014 | Magyar | |
| 2014/0368152 A1 | 12/2014 | Pasche | |
| 2015/0143891 A1 | 5/2015 | Cummings | |
| 2015/0143892 A1 | 5/2015 | Cummings | |
| 2015/0143893 A1 | 5/2015 | Cummings | |
| 2015/0143894 A1 | 5/2015 | Cummings | |
| 2015/0143895 A1 | 5/2015 | Cummings | |
| 2015/0143896 A1 | 5/2015 | Cummings | |
| 2015/0143897 A1 | 5/2015 | Cummings | |
| 2015/0143900 A1 | 5/2015 | Cummings | |
| 2015/0144818 A1 | 5/2015 | Cummings | |
| 2015/0147190 A1 | 5/2015 | Cummings | |
| 2015/0316936 A1 | 11/2015 | McCarrick | |

OTHER PUBLICATIONS

Web Page, NexPump, The Worlds Most Reliable Sump Pump, AI Extreme "Rage", https://www.nexpump.com/content/AI_Rage.shtml, Copyright 2005-2012 NexPump, Inc., (2 pages).

Wed Page, PittBoss, PitBoss Cellular Pump, Water, and Power Alarm, http://store.pumpalarm.com/PitBoss-Cellular-Alarm-p/s-pb/std.htm?utm_source=Google& . . . , Copyright 2014 PumpAlarm.com LLC, (3 pages).

Web Page, How Stuff Works, How Sump Pumps Work, Murray Anderson, at least as early as Jun. 10, 2011, http:/home.howstuffworks.com/home-improvement/plumbing/sump-pump4.htm, (3 pages).

Saltzman, R. What Happens When Your Sump Pump Fails? StarTribune. May 24, 2012. <URL: http://www.startribune.com/local/yourvoices/153532145.html>.

PCT/US2014/065347 International Search Report and Written Opinion for Sump Pump Test and Monitoring System.

PCT/US2014/065866 International Search Report and Written Opinion for Test and Monitoring System for a Dual Sump Pump Installation.

PCT/US2014/065867 International Search Report and Written Opinion for Test and Monitoring System for a Sump Pump Installation Having a Self-Monitoring Valve Module For . . . .

\* cited by examiner

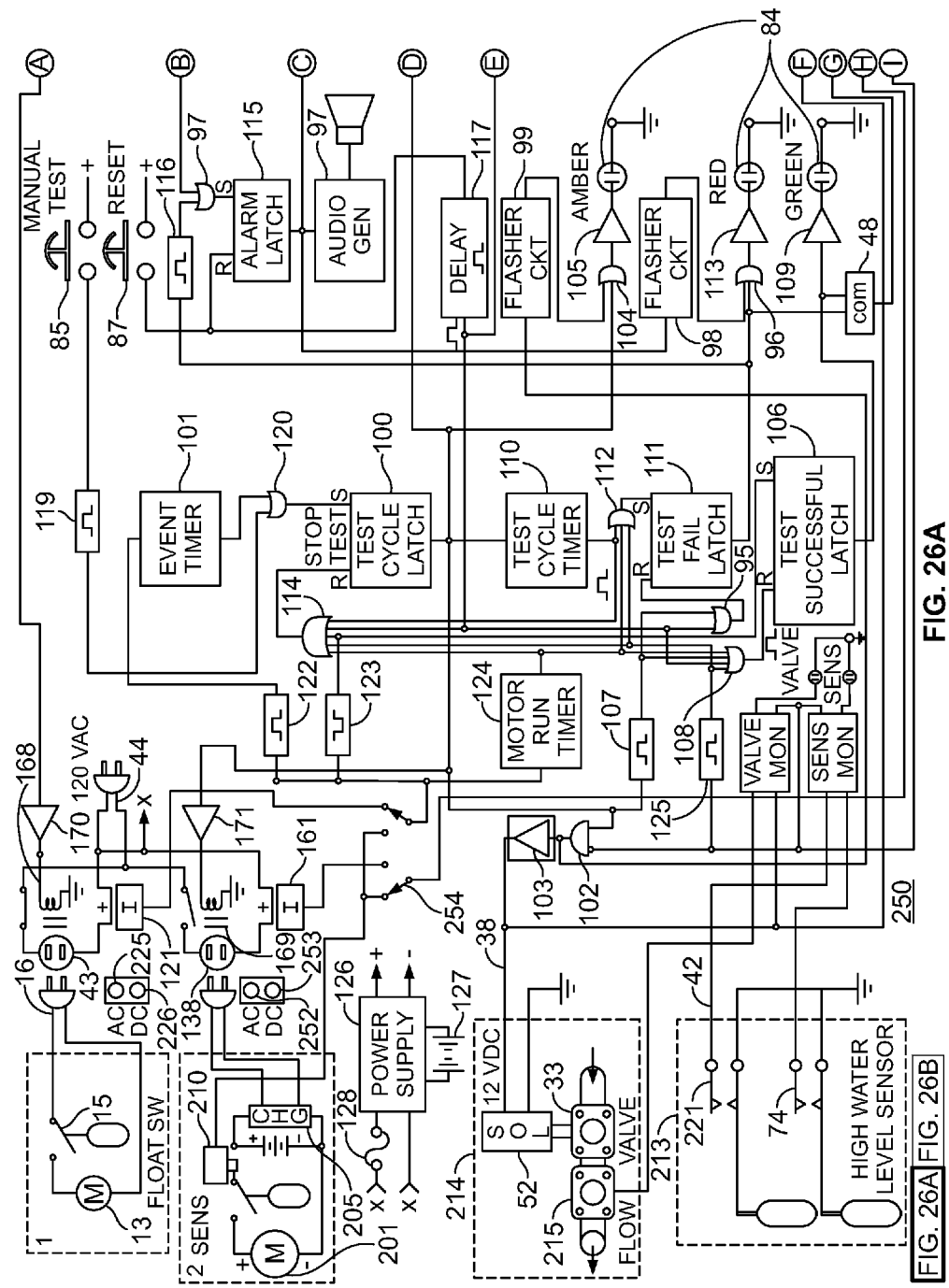

TEST AND MONITORING SYSTEM FOR A SUMP PUMP INSTALLATION HAVING A VARIABLE TEST CYCLE TIME OUT

CROSS-REFERENCE TO RELATED APPLICATIONS

This continuation-in-part application claims the benefit of U.S. Provisional Patent Application No. 61/908,881 filed on Nov. 26, 2013, U.S. Design patent application Ser. No. 29/486,504, filed on Mar. 31, 2014, and U.S. Non-Provisional patent application Ser. No. 14/281,525 filed on May 19, 2014, and further incorporates by reference in their entireties the following seven contemporaneously filed applications: (1) application Ser. No. 14/491,106, entitled "Test And Monitoring System For A Dual Sump Pump Installation" (2) application Ser. No. 14/491,135, entitled "Test And Monitoring System For A Battery-Powered DC Sump Pump Installation;" (3) application Ser. No. 14/491,207, entitled "Test And Monitoring System For A Sump Pump Installation Having A Self-Monitoring Valve Module For Admitting Water To The Sump Pit" (4) application Ser. No. 14/491,238, entitled "Test And Monitoring System For A Sump Pump Installation Having A Self-Monitoring Liquid Level Sensing Module;" (5) application Ser. No. 14/491,294, entitled "Test And Monitoring System For A Sump Pump Installation Including Trend Analysis Of Pump Motor Performance;" (6) application Ser.. No. 14/491,349, entitled "Test And Monitoring System For A Sump Pump Installation Operable From A Remote Location;" and (7) application Ser. No. 14/491,377, entitled "Test And Monitoring System For A Sump Pump Installation Having A Self-Protecting Valve Assembly For Admitting Water To The Sump Container."

BACKGROUND OF THE DISCLOSURE

The present disclosure relates to an automated system for monitoring and testing sump pump installations of the type commonly used in residential and commercial building basements. In particular, the disclosure is directed to a monitoring system for a sump pump installation which regularly tests and monitors the installation and proactively provides confirmation of a successful test and an alarm in the event of an unsuccessful test, and to improvements therein.

More specifically, sump pump installations are frequently provided in residential and commercial basements to remove ground water that accumulates around foundation footings and under the basement floor. To this end, a network of apertured drain tiles or flexible drain hoses is laid adjacent to the footings of the foundation walls on either the interior side or the exterior side of the walls, or both. These drain tiles or hoses are appropriately routed and sloped to drain accumulated water into one or more sump liners, which typically have inlets connecting with the network of drain tiles/hoses and are set in the basement floor to form a sump pit having a bottom portion below that of the tiles/hoses. The most commonly used type of sump pumps are electrically-powered sump pumps designed to be at least partially submerged by water in the sump pit. At least one electrically-powered sump pump is typically positioned in the sump pit and, when powered, functions to discharge water from the pit through a discharge pipe to a dispersal location, such as a storm sewer or exterior dispersal field. The sump pump typically includes a float switch which causes it to operate when the level of ground water (or other liquid) in the sump pit has reached a predetermined trigger level, ordinarily set below the lowest inlet in the liner wall. That float switch also typically terminates operation of the pump when the water reaches a predetermined minimum level below the trigger level. A check valve prevents water remaining in the discharge pipe from flowing back into the sump pit.

Should the sump pump fail to operate for any reason, such as, for example, motor failure, pump failure, or power failure, and should the drain network continue to flow ground water into the sump pit, the pit will often eventually overflow from the top of the sump liner and flood into the basement. This flooding may result in significant and often costly damage to items stored in the basement, as well as to existing basement improvements such as finished walls and furniture.

Various monitoring systems have come into use for warning the home or business owner of an impending overflow of the sump pit. Typically, these rely on a float switch or other types of liquid level detectors to sense an abnormally high liquid level in the sump pit and to cause an alarm to be sounded and/or a warning message to be sent to the owner. The drawback of these systems is that they only function when the pump is already in a condition in which it is no longer capable of preventing flooding, i.e. when the pump has failed and the pit is about to overflow. This is frequently too late for corrective action to be taken.

Another type of monitoring system that has come into use provides an independent liquid level sensing float switch, or other equivalent liquid level sensing device, in the pit which functions to supply power to the pump when a predetermined trigger level is reached. The current drawn by the motor and a fall in the liquid level in the pump is then utilized to confirm operation of the pump. Unfortunately, an alarm is only sounded at a time when operation of the pump is required to prevent flooding but the pump does not operate. This, again, may be too late for any corrective action to be taken.

Still other monitoring systems purport to reduce the likelihood of an overflow by providing a second back-up pump, typically set at a slightly higher level in the pit so as to operate only upon failure of the first pump, or an AC backup power source for the primary pump, such as a standby generator or a battery-powered inverter. Other systems provide a secondary DC battery-driven pump in the sump pit alongside the primary AC-driven pump. Another monitoring system, in addition to providing two pumps in the sump pit, causes the pumps to alternate in operation in response to incoming ground water thereby equalizing use between the pumps. While the provision of these systems may reduce the likelihood of a system failure, they do not proactively identify a pump failure prior to an impending flood event requiring immediately operation of the pump.

In contrast, the test and monitoring system of the present disclosure along with the described improvements therefor periodically confirms the operability of a sump pump installation and alerts the owner of a malfunction prior to the sump installation being required to operate to discharge drain water. This protective testing gives the owner sufficient time to correct the malfunction and thereby avoid what might otherwise be a serious basement flooding event. In the event the test and monitoring system of the disclosure is utilized in a two pump installation, both pumps are independently tested and monitored, and a failure of either pump, or both pumps, results in an alarm being sounded and appropriate messages being sent to the owner and/or the owners' designee(s) by communications channels such as, for example, the Internet, cell phone data or land line telephone communication channels.

Moreover, the regular and automatic testing provided by the test and monitoring system of the present disclosure has the further benefit of periodically placing any sump pumps in the monitored system in full operation to actually discharge water from the sump pit, thereby helping to prevent seals and bearings in the pump(s) and their motor(s) and associated check valve(s) from drying out or binding. Prior monitoring systems are reactive in that they act only in the event the monitored sump installation is actually called on to evacuate rising ground water, which may be only after extended periods of non-operation.

Accordingly, it is a general object of the present disclosure to provide an improved automatic test and monitoring system for a sump pump installation.

It is a more specific object of the present disclosure to provide an automatic sump pump test and monitoring system which functions proactively to alert a user to a malfunctioning sump pump installation prior to the installation being required to prevent an impending overflow and flood condition.

It is a still more specific object of the present disclosure to provide a sump pump test and monitoring system which periodically tests the operation of a sump pump installation and provides an alarm to the user in the event the installation fails to perform satisfactorily.

It is yet another specific object of the disclosure to provide a sump pump test and monitoring system which regularly admits liquid to the sump pump container of a sump pump installation to force the sump pump of the installation through a test cycle whereby satisfactory operation can be verified in advance of any actual need for the pump installation.

It is yet another specific object of the present disclosure to provide an improved automatic test and monitoring system in accord with the above stated objects which is functional with either or both AC-powered and battery-powered DC sump pumps.

It is yet another specific object of the present disclosure to provide in an improved sump pump test and monitoring system a removable current sensing module for installation on a conductor supplying direct current to a DC motor to enable the testing and monitoring of a battery-powered sump pump without regard to the duration of current flow.

It is yet another specific object of the present disclosure to provide a sump pump test and monitoring system which incorporates improvements in sensing, control and activation circuitry and systems therein to provide improved performance and reliability.

It is yet another specific object of the present disclosure to provide in an improved sump pump test and monitoring system an electrically actuated valve module having an independently connected flow transducer which provides a fault signal in the event of the valve failing in either a closed or in an open condition.

It is yet another specific object of the present disclosure to provide in an improved sump pump test and monitoring system a liquid level sensing module having dual independently connected float switches wherein the failure of either float switch results in a fault signal, and the remaining float switch provides a liquid level alarm signal.

It is yet another specific object of the present disclosure to provide in an improved sump pump test and monitoring system a time out adjustment circuit for causing the time out of a sump pump test cycle in response to variations in the flow rate of fresh water into the sump container.

It is yet another specific object of the present disclosure to provide in an improved sump pump test and monitoring system a circuit for recording and tracking trends and deviations in the run time and current consumption of a monitored sump pump to provide a warning signal in advance of a malfunction.

It is yet another specific object of the present disclosure to provide in an improved sump pump test and monitoring system a circuit enabling initiation of a sump pump test cycle in one or more designated installations from a remote location manually or automatically in advance of a weather event having a potential for flooding.

It is yet another specific object of the present disclosure to provide in an improved sump pump test and monitoring system a valve safety circuit providing protection against unintended actuation of the fill valve module as a result of a failure of the microprocessor by requiring the microprocessor to independently generate a unique command signal which is recognized by the safety circuit prior to activating the valve module.

BRIEF SUMMARY OF THE DISCLOSURE

In accordance with the disclosure, an automated system for monitoring and testing a sump pump installation of the type having a liquid container, a motor driven pump which when powered discharges liquid from the container, and a switch circuit which supplies current to power the pump motor upon the liquid level in the container rising to a first predetermined level, comprises a liquid conduit including an electrically-actuated valve which admits liquid into the liquid container in response to a valve control signal, a test control module which when actuated supplies a valve control signal to initiate a test cycle during which liquid is admitted to the container to cause the liquid level in the container to rise to at least the first predetermined level, after which the pump, if functional, discharges liquid from the container and the test cycle is terminated, and wherein the test control module includes a timer circuit which, if the test cycle is not terminated by the pump, terminates the test cycle and terminates application of the valve control signal to the valve after a predetermined time out period following initiation of the test cycle, and wherein the test control module further includes an indicator circuit which indicates upon termination of the test cycle whether the test was successful or unsuccessful.

BRIEF DESCRIPTION OF THE DRAWINGS

The present disclosure will be more fully understood by reference to the following detailed description of one or more preferred embodiments when read in conjunction with the accompanying drawings, in which like referenced characters refer to like elements throughout the drawings, and in which:

FIGS. 26A and 26B comprise a simplified block diagram partially in schematic form showing the principal components of the sump pump test and monitoring system of FIG. 24.

DETAILED DESCRIPTION OF THE EMBODIMENTS

The following description of the preferred embodiments is merely exemplary in nature and is no way intended to limit the disclosure, its application or use.

Figure 1:
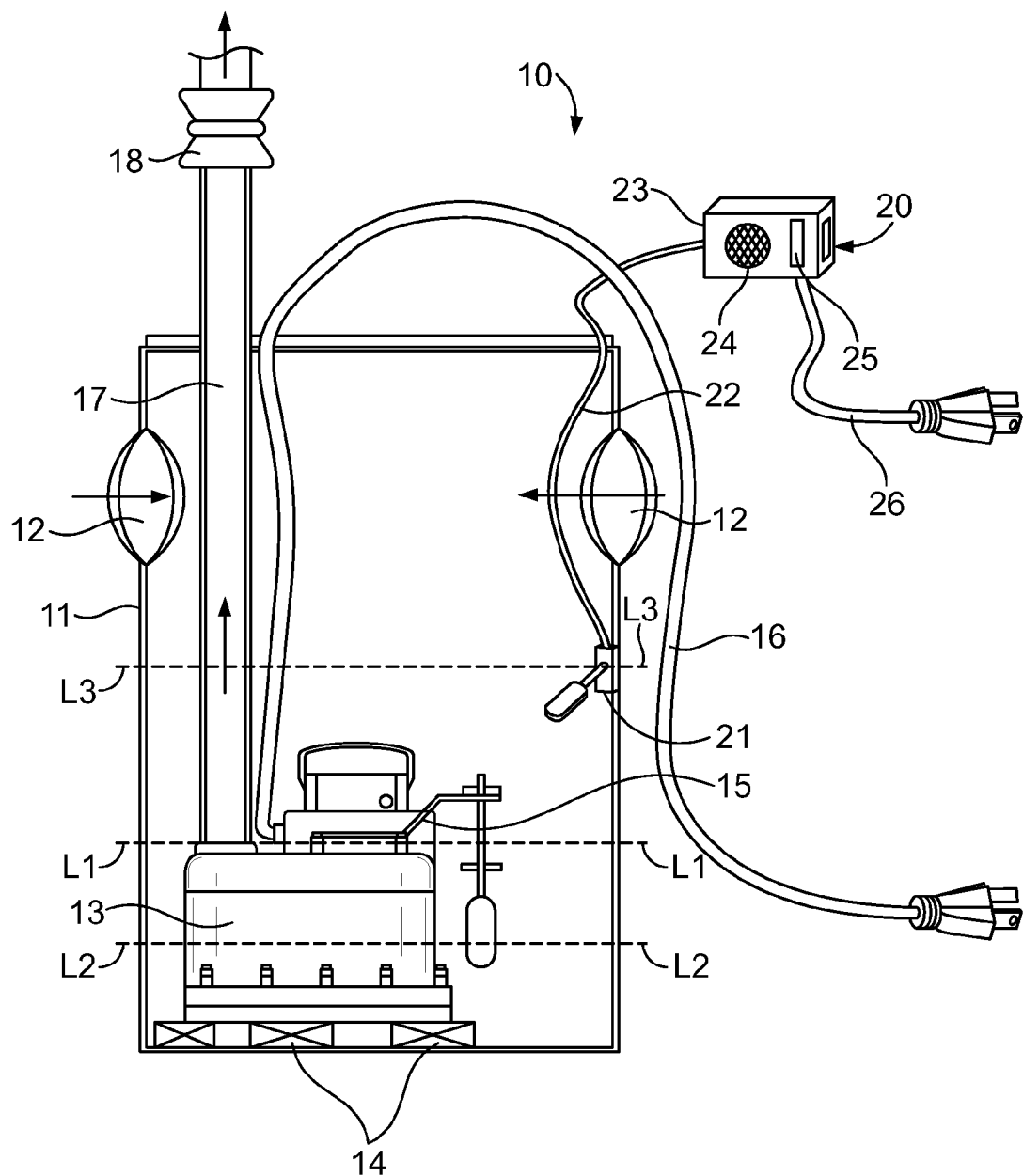
FIG. 1 is a simplified cross-sectional view partially in perspective of a conventional single sump pump installation having a liquid container, a motor-driven pump, a float switch integral to the pump, a pump discharge pipe and a high liquid level alarm.

Referring to FIG. 1, a prior art sump pump installation 10 of the type commonly used in basements of homes or businesses generally consists of a sump container or liner 11 having multiple inlets 12 through which drain water is received from one or more perforated hose or tile systems (not shown) disposed around the foundation footings of the building in which the sump pump installation is located. A motor driven sump pump 13 is typically positioned at or near the bottom of container 11, and may be supported by one or more bricks 14 or other spacers located between sump pump 13 and the bottom of container 11. Sump pump 13 may include an integral float switch assembly 15 which forms part of an electric circuit including a power cord 16 which supplies electric power to the pump motor upon the water level in container 11 rising to a first predetermined level L1 This causes pump 13 to discharge water from container 11 through a discharge pipe 17 and a conventional check valve 18 to a storm drain or other water dispersal facility (not shown). Float switch assembly 15 interrupts the application of electric power to the pump motor when the water level in container 11 falls to a second predetermined level L2 below the first predetermined level L1.

Frequently, a high water monitoring system 20 may be provided to signal that the water level in container 11 has risen to a third predetermined level L3 above the first predetermined level L1, and therefore above the normal operating range of pump 13 to alert the user of a possible pump failure. In the illustrated embodiment of FIG. 1, monitoring system 20 includes a second float switch assembly 21 positioned within container 11 such that when the water level in the container rises to the third predetermined level L3, float switch 21 closes and provides an actuating signal through a cable 22 to an alarm module 23. The alarm module 23 may include an aural alarm transducer 24 and a connector 25 for remotely signaling the high water condition. Power may be supplied to the high water monitor system 20 by means of a conventional power cord 26.

Sump pump 13 in the embodiment of FIG. 1 is connected directly to the AC line by cable 16, the integral float switch assembly 15 serving to control the application of AC power to the pump motor. In other embodiments, sump pump 13 may be provided with an external non-integral float switch (not shown) which may be separately connected through another cable (not shown) to the AC power source of the pump. Typically, the additional cable is provided with a break-out connector (not shown) which includes an AC plug for insertion into an AC supply wall outlet on one side and a switched AC receptacle on the opposite side for receiving the AC plug on the end of the pump power cord. The AC plug is inserted into the AC supply receptacle and the AC plug associated with the pump motor is inserted into the switched AC receptacle of the break-out connector. This has the advantage of allowing float switch assembly 15 to be replaced without replacing or dismantling sump pump 13, and enables sump pump 13 to be tested by removing the AC plug of the pump power cord from the break-out connector and inserting the conventional AC plug of the pump motor directly into the AC supply wall outlet.

In other embodiments, an independent control circuit (not shown) is provided for powering the pump motor. In these installations, the pump motor has no associated flow switch and receives operating power from the independent control system. The independent system may include one or more float switches or other water level detecting devices which cause the pump motor to be powered and unpowered as the water level in the sump container rises and falls to predetermined levels. These independent pump control systems may include means for monitoring the current draw of the motor to provide an alarm in the event of pump motor failure.

Figure 2:
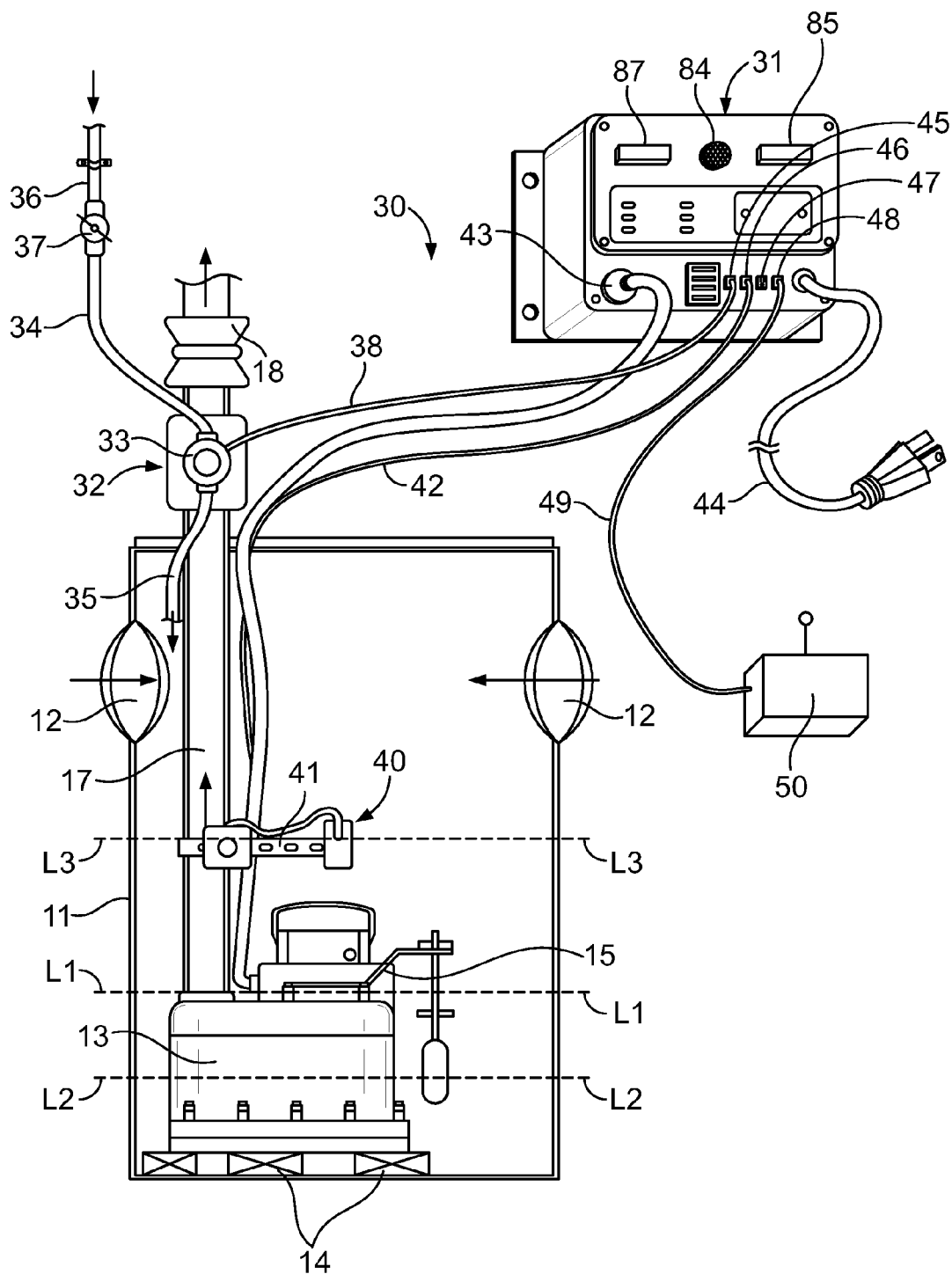
FIG. 2 is a simplified cross-sectional view partially in perspective of a single sump pump installation which incorporates an automated test and monitoring system constructed in accordance with the present disclosure.

Referring to FIG. 2, a sump pump test and monitoring system 30 constructed in accordance with one embodiment of the disclosure is provided to automatically and proactively test and monitor the operation of the sump pump installation and provide an alarm in the event of the sump pump installation failing to operate. System 30 includes a control module 31 which contains the electronic circuitry and various switches, indicators and connectors associated with the system. System 30 further includes in accordance with the disclosure a valve assembly 32 for admitting fresh water to container 11. Valve assembly 32 is mounted directly on pump discharge pipe 17 and includes a solenoid-actuated valve 33 which is connected on one side to a fresh water supply (not shown) by a length of flexible tubing 34 and on its other side to container 11 by either a length of flexible hose or a length of semi-rigid copper tubing 35. The fresh water source is preferably accessed by a length of copper tubing 36 which extends from the source and connects to the length of flexible tubing 34 through a manual shutoff valve 37. The solenoid of solenoid valve 33 is electrically connected to control module 31 by a cable 38. Valve assembly 32, together with the length of flexible tubing 34 and the length of semi-rigid copper tubing 35 provides a fluid conduit which supplies fresh water to container 11 when called for by test and monitoring system 30.

Test and monitoring system 30 further includes a float switch assembly 40 positioned within container 11 at a predetermined level L3 by an adjustable bracket 41 secured to pump discharge pipe 17. Upon the water level in container 11 rising to level L3, float switch assembly 40 is actuated and provides an electrical signal to circuitry within control module 31 through a cable 42 which signals that the water level in container 11 has risen to a level above the maximum level that would be achieved if sump pump 13 were operative.

Control module 31 includes an AC receptacle 43 for receiving a conventional AC plug on the end of the power cord 16 of pump motor 13. Control Module 31 also includes an AC power cord 44 for receiving AC power from an AC supply wall receptacle (not shown). In one embodiment, four connectors 45-48 (see FIGS. 2 and 7) are provided on the front panel of control module 31 to connect to the various components of system 30. In particular, connector 45 connects to cable 38 of the valve assembly 33, connector 46 connects to cable 42 of float switch assembly 40, connector 48 connects through a cable 49 to an (optional) external communication module 50, and connector 47 provides dry contacts for connection to an external alarm system.

Figures 3, 4:
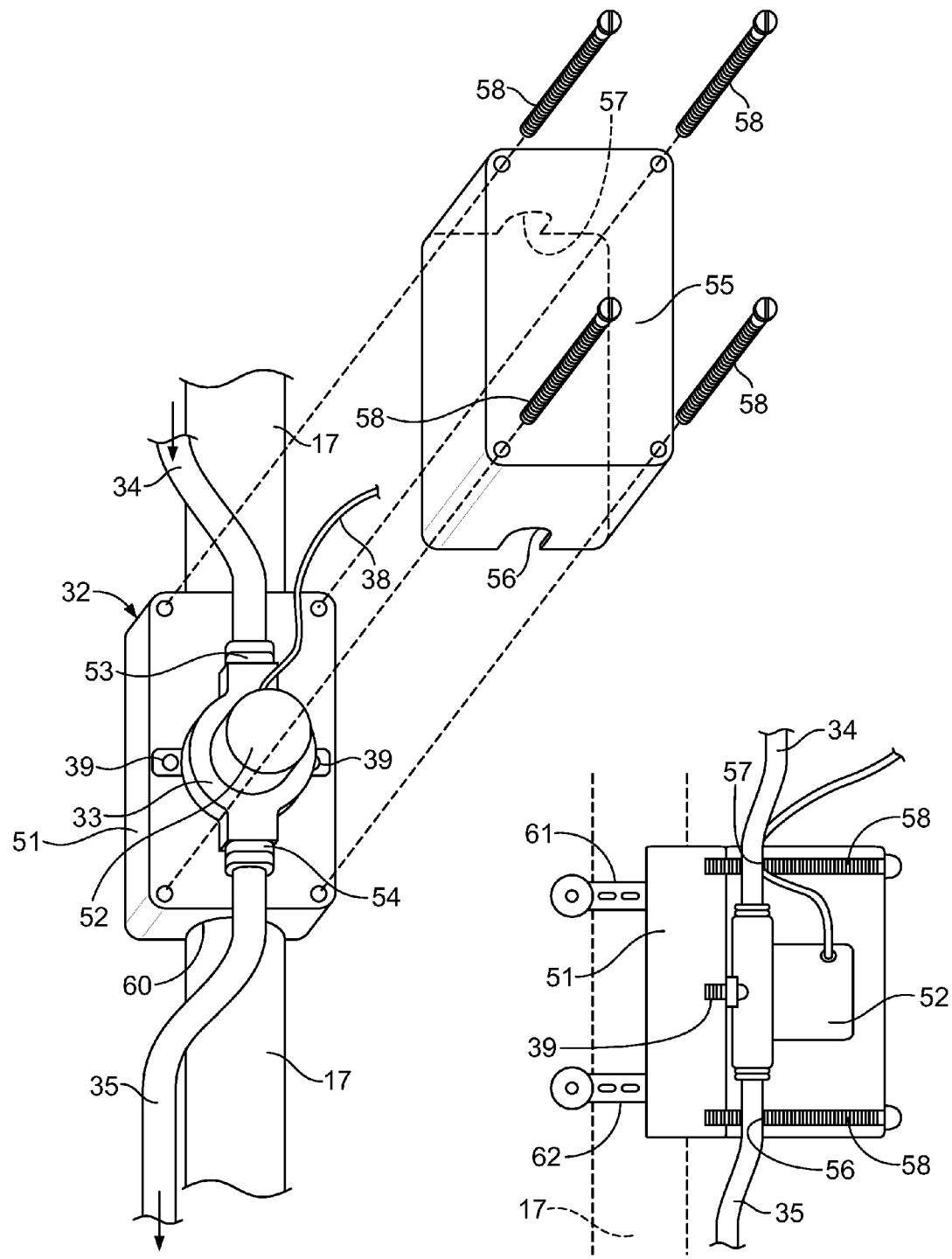
FIG. 3 is an enlarged perspective view of the solenoid-actuated liquid valve assembly utilized in the test and monitoring system of FIG. 2.
FIG. 4 is an enlarged cross-sectional view partially in perspective of the solenoid-actuated valve assembly of FIG. 3.

As shown in FIGS. 3 and 4, solenoid actuated valve assembly 32 includes a base member 51 on which the solenoid-actuated valve 33 is mounted by machine screws 39 or other appropriate means. It will be appreciated that other valve mounting configurations may be provided as dictated by the construction of the valve body. Valve 33, which may be conventional in design and construction, includes a solenoid actuator 52 and conventional inlet and outlet fittings 53 and 54 on respective sides of the valve to receive and engage conduits 34 and 35, respectively. A removable cover 55 dimensioned to securely engage the rim of base member 51 is preferably provided to protect the valve from mechanical damage. The cover may include slots 56 and 57 to accommodate the tubing segments on either side of the valve. The cover may be secured in place by a plurality of (machine) screws 58 threaded into the top surface of base member 51. Base member 51 is preferably provided with an appropriately shaped laterally-extending channel 60 (see FIG. 3) on its bottom surface to contiguously engage the outer surface of discharge pipe 17. Two laterally-spaced adjustable retaining straps 61 and 62 (see FIG. 4) are provided to firmly secure base member 51 to discharge pipe 17.

Figure 5:
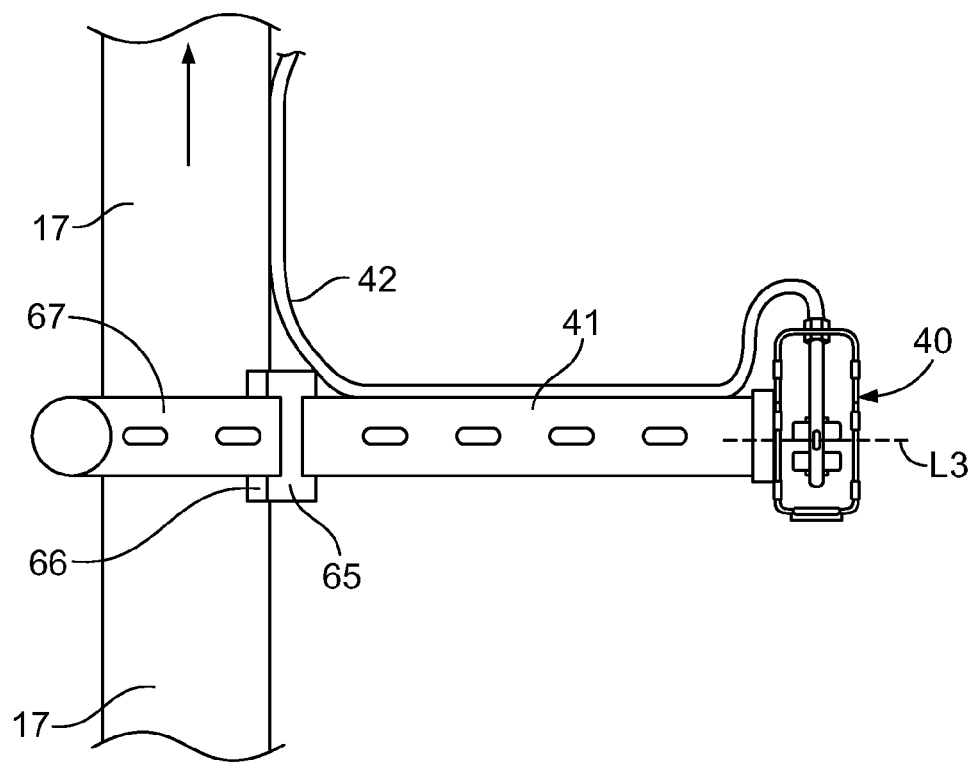
FIG. 5 is an enlarged perspective view in cross section showing the float switch assembly utilized in the test and monitoring system of FIG. 2.

Referring to FIG. 5, float switch assembly 40 includes an adjustable bracket 41 which is secured to pump discharge pipe 17 by means of a base member 65. Base member 65 includes a laterally-extending channel 66 on its rear surface shaped to contiguously engage the outer surface of pump discharge pipe 17. An adjustable strap 67 extends from base member 65 around discharge pipe 17 to draw the base member tightly against the pipe and thereby hold float switch assembly 40 firmly in position.

Figure 6:
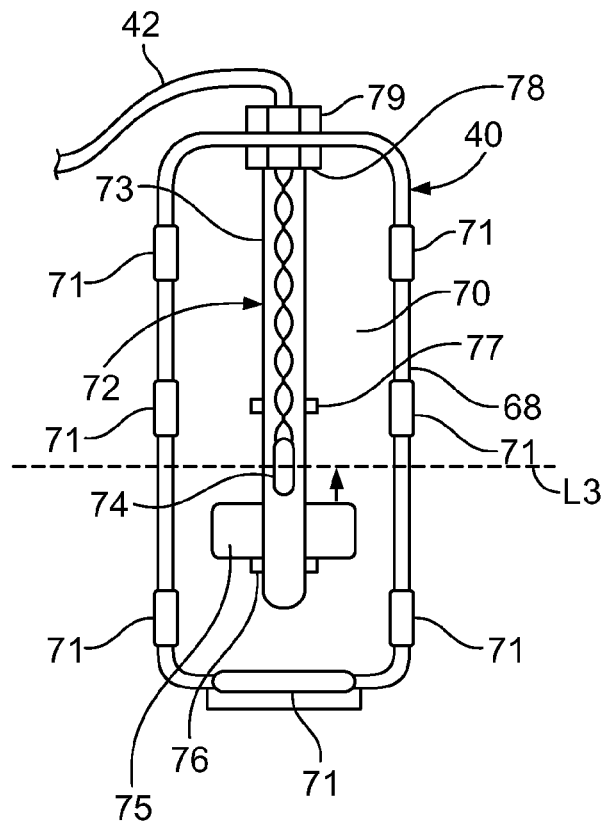
FIG. 6 is an enlarged cross-sectional view partially in perspective of the float switch utilized in the float switch assembly of FIG. 5.

As shown in FIG. 6, float switch assembly 40 includes a generally cylindrical housing 68 forming a chamber 70. Housing 68 includes a plurality of apertures 71 through which liquid is admitted into the chamber. A float switch assembly 72 is provided within chamber 70. Float switch assembly 40 further comprises a hollow shaft 73 formed of a non-magnetic material within which at least one magnetically-actuated reed switch 74 is positioned. A toroid-shaped float assembly 75 containing an internal magnet is dimensioned to slide along the axis of shaft 73 as the water level rises and falls within the chamber. A pair of washers 76 and 77 attached to shaft 73, limit the axial movement of float assembly 75 such that the magnet in float assembly 75 overlies and actuates reed switch 74 as it reaches its maximum level. Reed switch 74 is electrically connected to module 31 by cable 42 to signal the circuitry within the module that the reed switch has been actuated by the water level in container 11 rising to level L3. Switch assembly 72 is held in position along the axis of cylindrical chamber 70 by a threaded end portion 78 of shaft 73 secured to the upper end of the housing by appropriate mounting hardware 79.

It will be appreciated that the liquid level sensing function of float switch assembly 40 can be accomplished by other forms of water level detectors. For example, a conventional float switch of the type having a float and an arm connected to a mechanically actuated switch can be utilized. Or, an electronic switch either of the type which senses conductivity between two sensing electrodes, or of the type that senses water pressure on a submerged pressure transducer, can be utilized.

Figure 7:
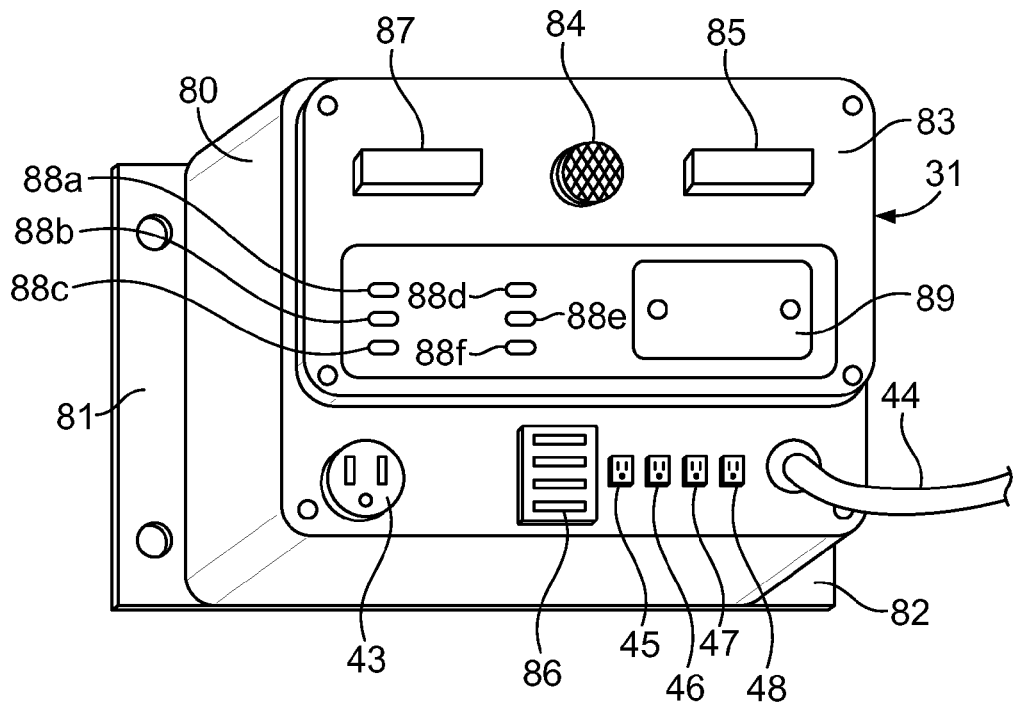
FIG. 7 is an enlarged perspective view of the control module of the sump pump test and monitoring system of FIG. 2 adapted for mounting on a wall or other flat support surface.

As shown in FIG. 7, control module 31 of test and monitoring system 30 may include a generally rectangular housing 80 having flanges 81 and 82 for mounting to a wall or other flat support surface. Front panel 83 of the module may include a three-color LED indicator lamp 84 for visually indicating the status of the sump pump installation being tested and monitored. In a preferred embodiment, this indicator illuminates green for a functioning pump installation, red for a non-functioning pump installation, and amber for a pump installation untested or under test. The amber indication may be flashing while the solenoid-actuated valve 33 is admitting water to container 11. A test of the sump pump installation can be manually initiated by means of a push-button TEST switch 85 located on front panel 83. Momentarily pressing switch 85 initiates a normal test cycle of the pump sump installation. An unsatisfactory test result is signaled to the user by indicator 84 flashing red and an aural alarm provided by a panel-mounted transducer 86. The aural alarm, which is preferably in the form of a loud repetitive "beep" or "chirp," can be reset by momentary actuation of a push-button RESET switch 87, also located on front panel 83. Momentarily pressing this switch will silence the aural alarm and change the accompanying flashing red indication of indicator 84 to a steady red indication for a predetermined period of time, such as, for example, six hours, after which the aural alarm and flashing red indication again occur. Shorter or longer time periods for muting the alarm can be programmed into system 30 as desired.

Actuating RESET switch 87 for an extended period of time, such as, for example, five seconds, will result in a complete reset of the system. The flashing or steady red illumination of indicator 84 will extinguish and the aural alarm provided by transducer 86 will cease. However, a green illumination of indicator 84 indicating a satisfactory pump installation test will not occur until test switch 85 has been subsequently actuated and a subsequent test of the installation has been satisfactory.

Various fault details, such as internal battery status, AC supply status, sensor status, valve status, and communications status, may be provided by a plurality of indicator lamps 88a-88f on front panel 83. In addition, a removable cover 89 may be provided to access a rechargeable battery (not shown in FIG. 7) provided within housing 80 to power the test and monitoring system circuitry within module 31 in the event of AC power failure.

Figure 8:
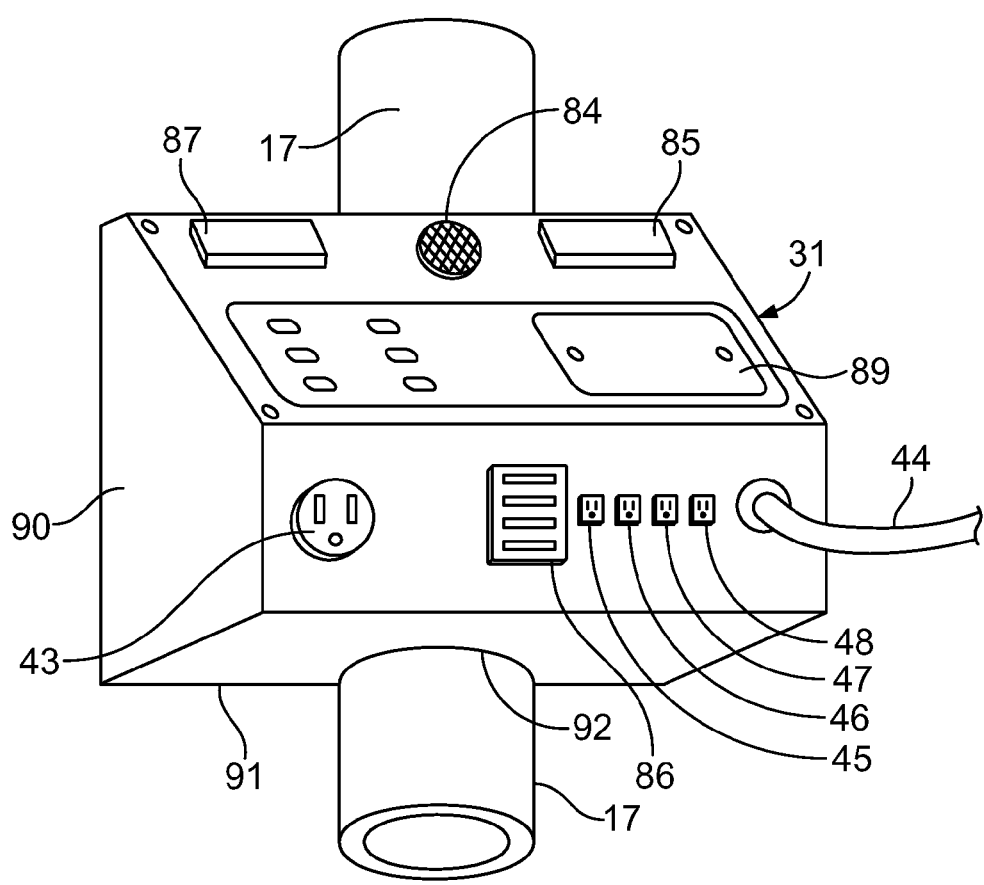
FIG. 8 is an enlarged perspective view in an alternate housing construction for the control module of FIG. 7 adapted for mounting directly on the discharge pipe of the sump pump installation.

Referring to FIG. 8, control module 31 of test and monitoring system 30 may be contained in an alternative housing 90 adapted to be mounted directly on the outer surface of pump discharge pipe 17. In this embodiment, rear wall 91 of housing 90 is provided with a channel 92 shaped to contiguously engage the outer surface of discharge pipe 17. A pair of adjustable straps (not shown) extends from the rear wall 91 and wrap around discharge pipe 17 to draw the housing into contiguous firm engagement with pipe 17. The same controls, indicators and connectors present in the embodiment of FIG. 7 can be provided in this embodiment.

Figure 9:
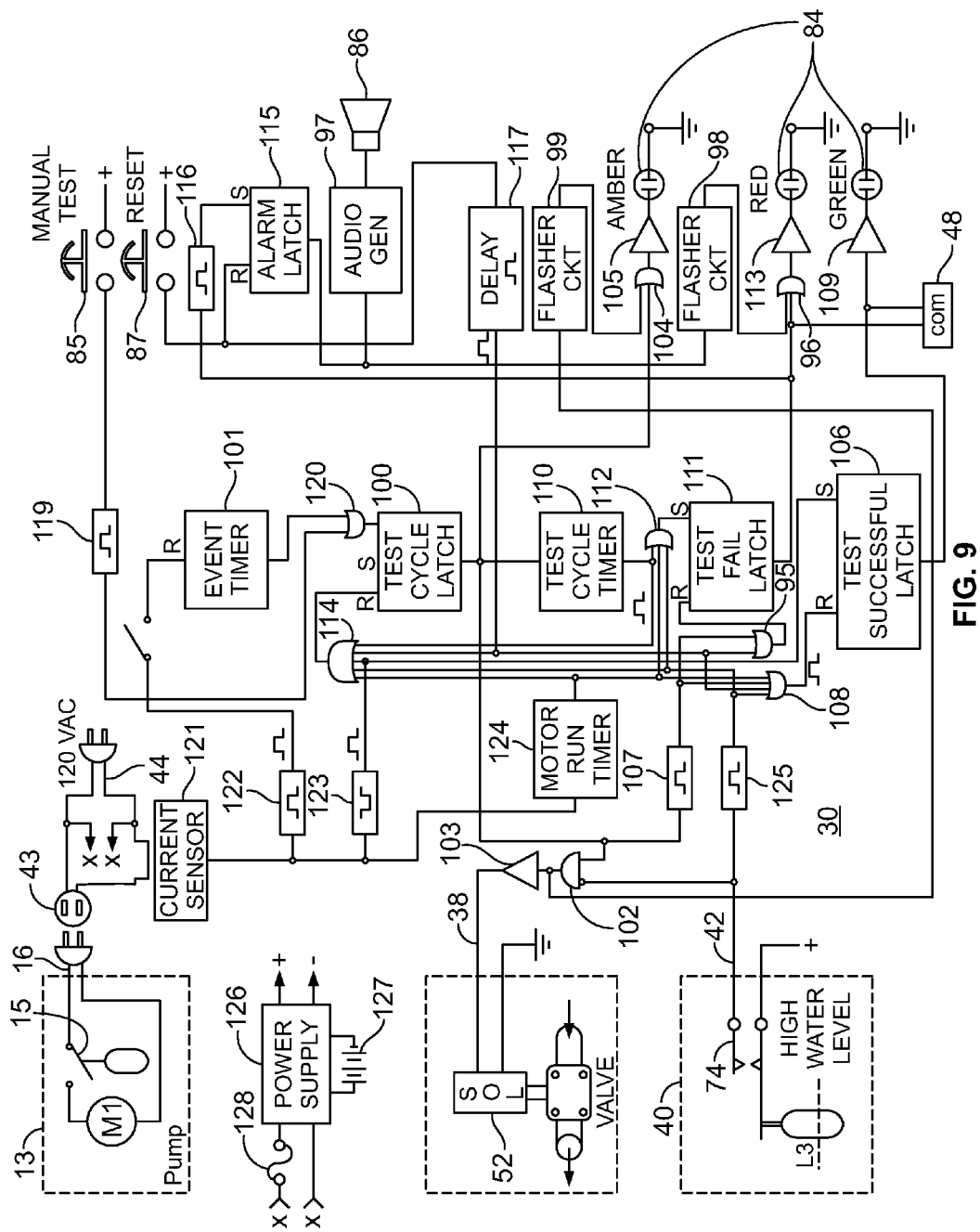
FIG. 9 is a simplified functional block diagram partially in schematic form showing the principal components of the test and monitoring system of FIG. 2.

FIG. 9 illustrates the principal components of one embodiment of the test and monitoring system 30 of the present disclosure in a simplified functional block diagram. As shown therein, the occurrence of a test cycle is determined by a TEST CYCLE LATCH 100 which transitions to a SET state during the occurrence of a test cycle, and to a RESET state in the absence of a test cycle. In normal use, TEST CYCLE LATCH 100 is periodically conditioned to a SET state by an EVENT TIMER 101 which provides a momentary output signal through an OR gate 120 on a calendar basis or after a predetermined time interval has lapsed following the most recent input applied to the timer. In one embodiment, EVENT TIMER 101 may be set, for example, to generate a momentary output signal either every seven days, or every seven days after receipt of the most recent input signal, in which case a test cycle of the sump pump installation will occur.

When TEST CYCLE LATCH 100 is in a SET state, a signal is also applied through an AND gate 102 and a solenoid driver circuit 103 to solenoid 52 of valve assembly 33 to condition valve assembly 33 to admit water into container 11. Water continues to be admitted until either TEST CYCLE LATCH 100 reverts back to a RESET state, or the high water float switch assembly 40 provides an inhibit signal to AND gate 102. When valve assembly 33 is open, FLASHER CIRCUIT 99 is activated to cause the amber illumination of indicator 84, if active, to flash.

When TEST CYCLE LATCH 100 is in a SET state, it provides an output signal causing indicator 84 to illuminate amber through an AND gate 104 and an LED driver 105. Also, TEST CYCLE LATCH 100 in its SET state resets a TEST SUCCESSFUL LATCH 106 through a signal conditioning pulse circuit 107 and an OR gate 108, and resets a TEST FAIL LATCH 111 through an OR gate 95. This terminates the output of TEST SUCCESSFUL LATCH 106 such that the green illumination of indicator 84 driven through an LED driver 109 is extinguished, and the output of TEST FAIL LATCH 111 such that the red illumination of indicator 84 driven through AND gate 96 and an LED driver 113 is extinguished. Thus, only the amber illumination of indicator 84 is active during a test cycle.

The output of TEST CYCLE LATCH 100 is also applied to a TEST CYCLE TIMER 110 which times the duration of the test cycle and provides a momentary timeout output signal in the event the duration of the SET state of TEST CYCLE LATCH 100, and hence the duration of the test cycle, exceeds a predetermined maximum period of time. In the event of this timeout, TEST CYCLE TIMER 110 applies a SET signal to transition TEST FAIL LATCH 111 to a SET state through an OR gate 112. This causes a red illumination of indicator 84 through AND gate 96 and LED driver 113. Also, the output of TEST CYCLE TIMER 110 causes TEST CYCLE LATCH 100 to be reset by means of a signal provided through an OR gate 114, thereby terminating the test cycle and extinguishing the amber illumination of indicator 84. The output of TEST FAIL LATCH 111 conditions an ALARM LATCH 115 to a SET state through an interface circuit 116, thereby causing an AUDIO GENERATOR 97 to generate an audible alarm through transducer 86. ALARM LATCH 115 can be reset by momentary actuation of RESET switch 87, in the manner previously described. ALARM LATCH 115 also enables FLASHER CIRCUIT 98 to cause the red illumination of indicator 84 to flash until the latch is reset, RESET switch 87 also serves, through a delay circuit 117, when held for an extended period of time, to reset TEST CYCLE LATCH 100 through OR gate 114, to reset TEST FAIL LATCH 111 through OR gate 95, and to reset TEST SUCCESSFUL LATCH 106 through OR gate 108, thereby conditioning the system for a subsequent test. A manual test can be initiated by TEST switch 85 through a signal conditioning pulse circuit 119 and OR gate 120.

The output of MOTOR CURRENT SENSOR 121 also provides a reset signal through a switch and a signal conditioning pulse circuit 122 to EVENT TIMER 101, optimally causing that timer to begin a new timing period with each operation of the motor. The output of MOTOR CURRENT SENSOR 121 is also applied to a signal conditioning pulse circuit 123, which provides a momentary pulse upon the motor stopping. This pulse, signaling the completion of a successful test, is applied through OR gate 114 to reset TEST CYCLE LATCH 100 to terminate the test cycle. The same motor stop pulse also serves to condition the TEST SUCCESSFUL LATCH 106 to a SET status to indicate successful completion of a test cycle by illuminating the green indication of indicator 84 through LED driver 109. A further function of MOTOR CURRENT SENSOR 121 is to initiate a timeout period in a MOTOR RUN TIMER 124. In the event pump motor 13 operates continuously for a period exceeding the timeout period of MOTOR RUN TIMER 124, the timer generates an output signal which resets TEST CYCLE LATCH 100 through OR gate 114 and conditions TEST FAIL LATCH 111 to a SET state through OR gate 112. This causes the red illumination of indicator 84 through AND gate 93 and LED driver 113. Also, the output of MOTOR RUN TIMER 124 resets the TEST SUCCESSFUL LATCH 106 through OR gate 108 to extinguish the green illumination of indicator 84.

In the event pump motor 13 fails to operate during a test cycle, the eventual closure of high water sensing switch assembly 40 causes an inhibit signal to be applied to AND gate 102, preventing further operation of solenoid 52 to prevent further water from being admitted to sump container 11. Also, the closure of high water level switch assembly 40 causes a pulse to be applied through signal conditioning pulse circuit 125 and OR gate 108 to reset TEST SUCCESSFUL LATCH 106, through OR gate 114 to reset the TEST CYCLE LATCH 100, and through OR gate 112 to condition TEST FAIL LATCH 111 to a SET state. Thus, a high water condition for any reason results in the red illumination of indicator 84 while the amber and green illuminations of indicator 84 are extinguished, and in the event of an active test cycle, valve 33 is closed to prevent any further fresh water from being admitted to sump container 11.

The system includes a conventional low voltage power supply 126 for supplying 12 VDC operating power to solenoid-actuated valve 33 and to the various functional circuits of the controller. Power supply 126 includes a rechargeable battery 127 to supply operating power to the control module component in the event of AC power failure. During normal operation AC power is supplied to power supply 126 through AC power cable 44 and an internal protective fuse 128.

The status of TEST FAIL LATCH 111 and TEST SUCCESSFUL LATCH 106 is provided to the external communications module 50 (not shown in FIG. 9) through connector 48. Additional status information, including the serial number of the system and the time and nature of an event occurrence, can also be provided to the communications module through this connector.

Figure 10:
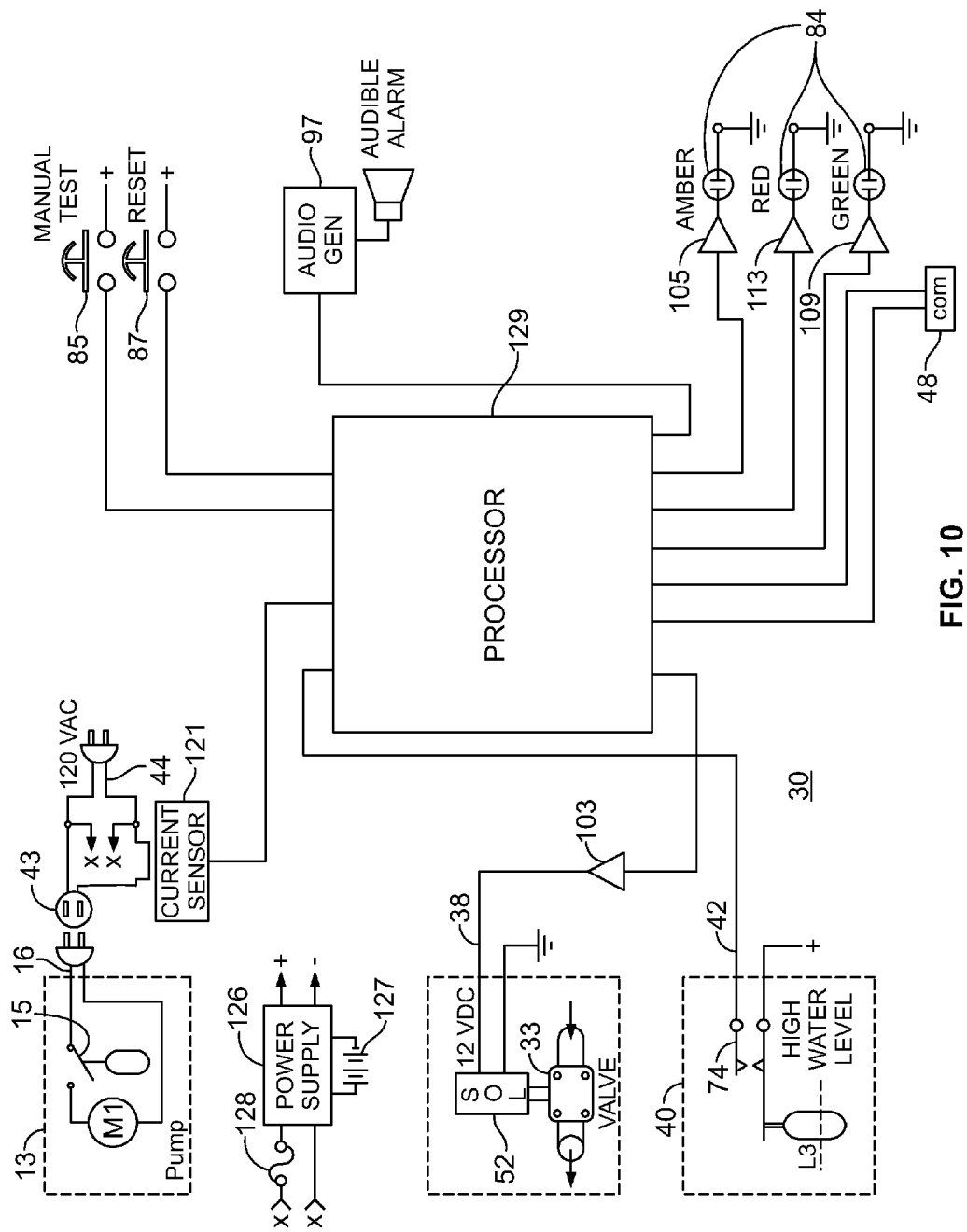
FIG. 10 is a simplified functional block diagram partially in schematic form showing the implementation of the test and monitoring system of FIG. 9 utilizing a microprocessor.

Referring to FIG. 10, many of the functions heretofore described with respect to FIG. 9 can be more efficiently accomplished by a microprocessor implementation of the control system. In particular, a single microprocessor 129 can be provided with the various sensing and control inputs previously described and programmed to carry out the logic and timing functions required by the system. Previously described outputs to the green, red and amber indications of indicator 84 can be provided by the processor as well, as can the necessary data required for bi-directional communication through communication port 48 to the external communications module 50 (not shown in FIGS. 9 and 10). The programming of microprocessor 129 is well within the capabilities of one skilled in the art of microprocessors and the preparation of associated firmware and software.

Figure 11:
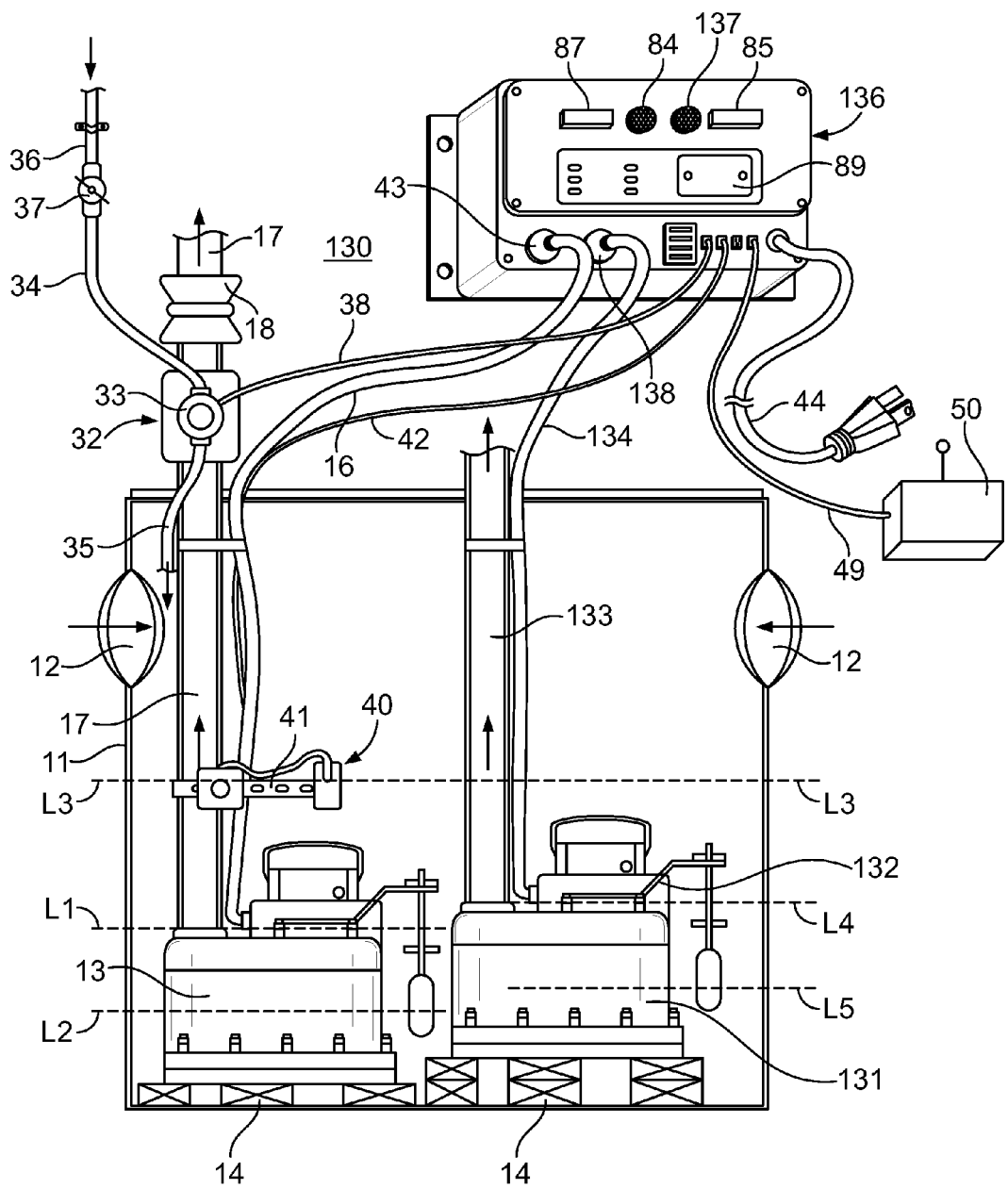
FIG. 11 is a cross-sectional view partially in perspective showing an automated test and monitoring system constructed in accordance with the disclosure in use with a dual pump sump pump installation.

The test and monitoring system described in the disclosure can also be effectively utilized to test and monitor a dual sump pump installation 130. Referring to FIG. 11, in a dual sump pump installation, a second motor driven sump pump 131 is provided in sump container 11, typically at a slightly higher level than the first motor driven pump 13. Pump 131, like previously described pump 13, may include an integral float switch 132 which initiates operation of pump 131 when the water level in container 11 rises to a fourth predetermined level L4. Float switch 132 discontinues operation of pump 131 when, as a result of pump 131 discharging water from sump container 11, the water level in container 11 falls to a predetermined lower level L5. As with sump pump 13, second sump pump 131 has a discharge pipe 133 through which pump 131 discharges water from container 11. A power cord 134 is provided together with circuitry associated with internal pump float switch 132 to power pump 131. Additional support bricks 14 may be provided to raise pump 131 to a level higher than that of the pump 13 so that in normal operation pump 131 only operates in the event of failure of pump 13.

Figure 12:
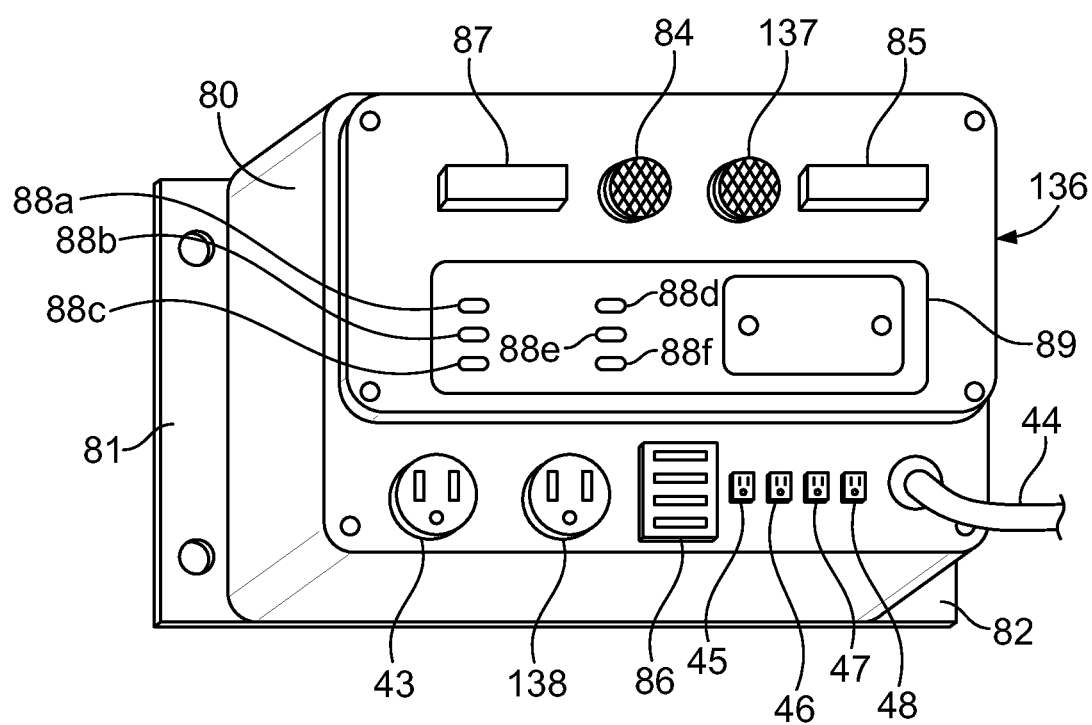
FIG. 12 is an enlarged perspective view of the control module utilized in the sump pump test and monitoring system of FIG. 11.

In accordance with the present disclosure, test and monitoring system 130 includes additional components and circuitry to enable the system to test and monitor the two sump pumps in a manner similar to that of previously described single sump pump test and monitor system 30. Referring to FIGS. 11 and 12, test and monitoring system 130 includes a control module 136 similar to the control module 31 of system 30, except that the module includes a second status indicator light 137 for indicating the operating status of the second sump pump 131, and a second AC receptacle 138 for receiving an AC plug associated with the power cord 134 of pump 131. This control module 136 is intended to be mounted on a flat supporting surface in the same manner as the previously described control module 31. Power is supplied to control module 135 by a power cord 44 in the manner previously described and a communication module 50 (not shown) may be connected to connector 48 as previously described. In addition, solenoid-actuated valve assembly 32 is connected by cable 38 to connector 45, and float switch assembly 40, set at predetermined high water level L3 (which is higher than predetermined water trigger level L4 of pump 131), is connected by cable 42 to connector 46. Operation of control module 136 is identical to that of the previously described control module 31 with the exception of the previously identified provision of indicator 137 and receptacle 136 to accommodate the second sump pump 131.

Figure 13A:
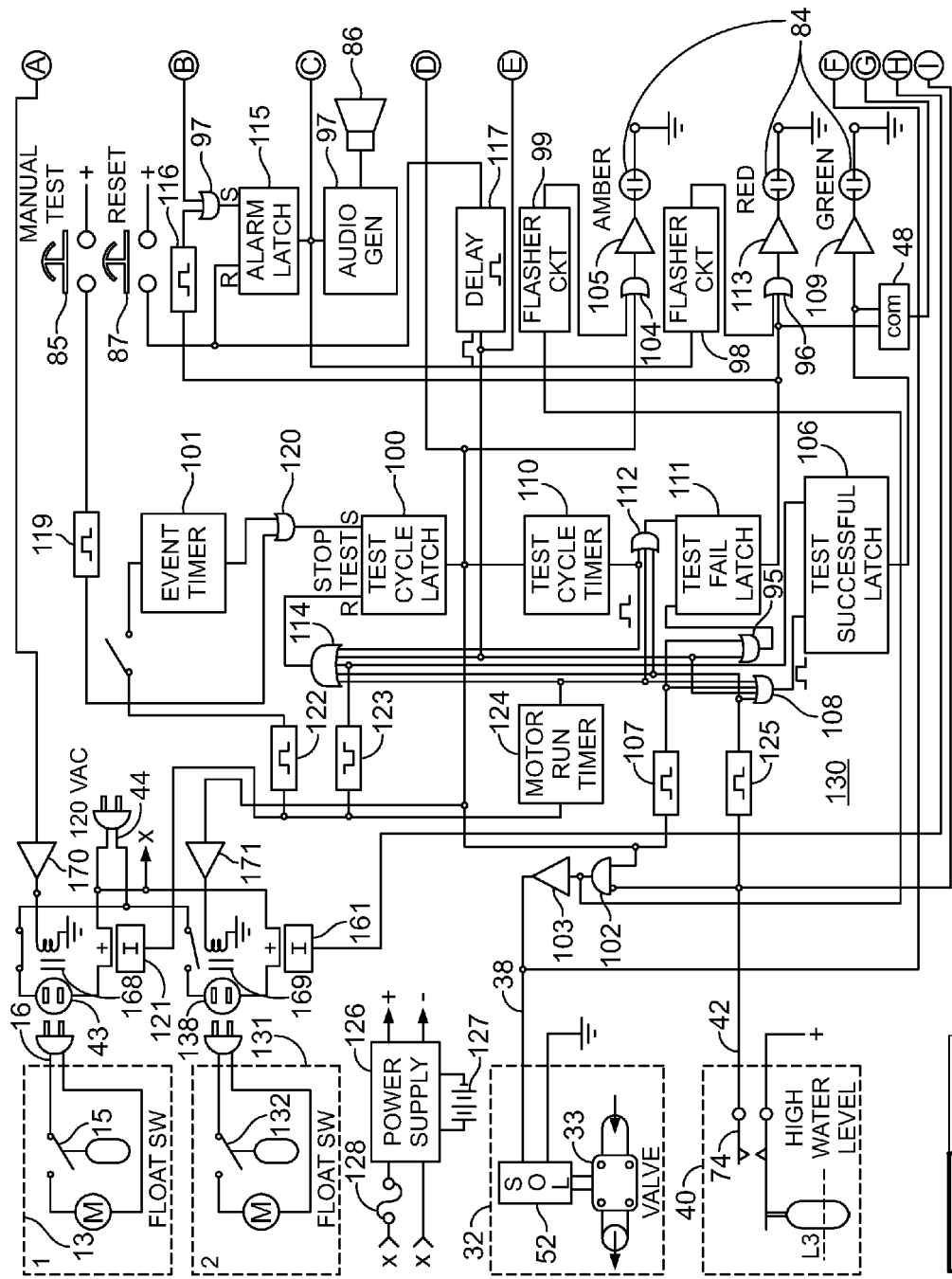
FIGS. 13A and 13B comprise a simplified functional block diagram partially in schematic form showing the principal components of the test and monitoring system of FIG. 11.
Figure 13B:
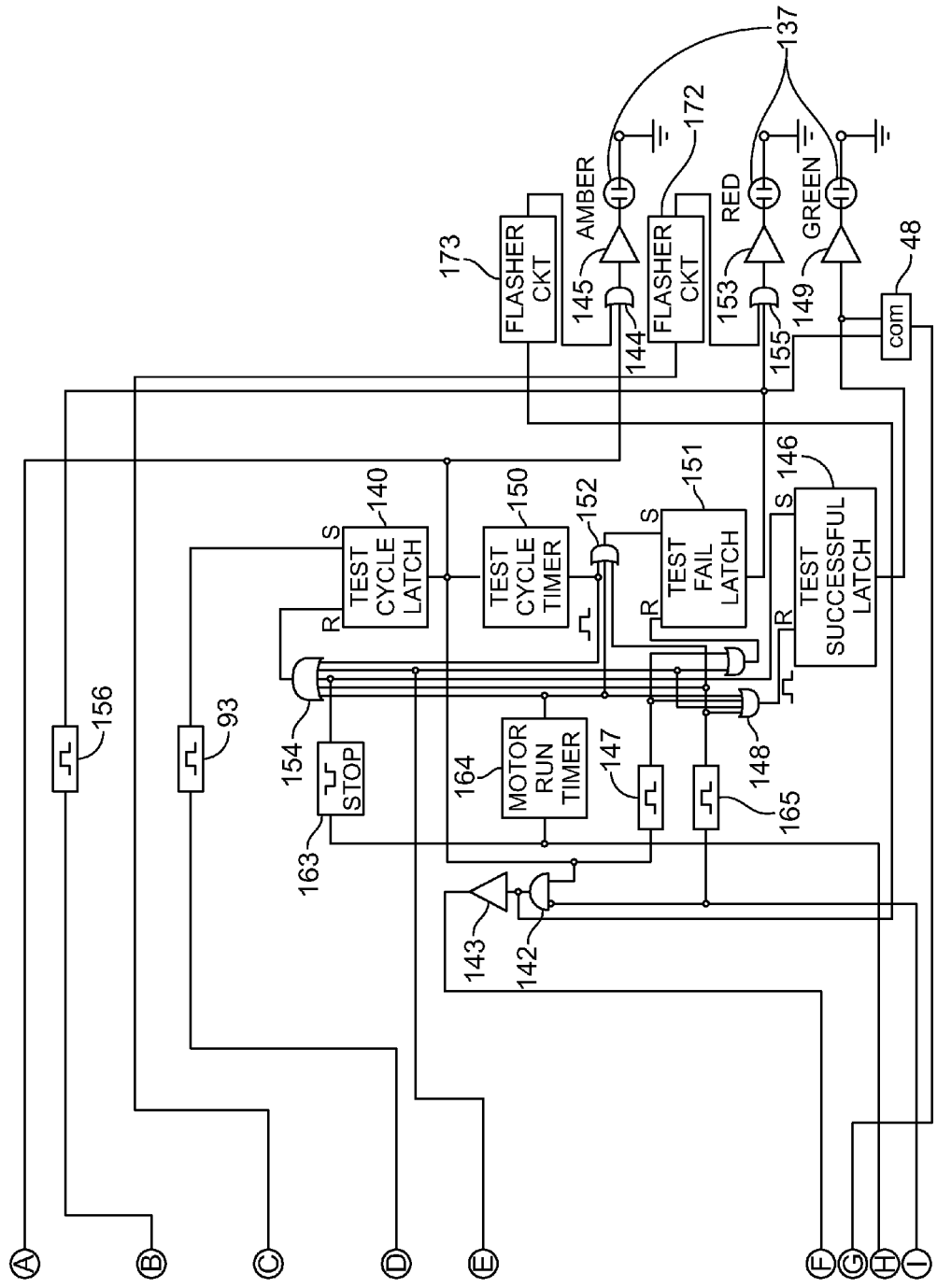

The operation of dual pump test and monitoring system 130 is illustrated in the simplified functional block diagram of FIGS. 13A and 13B. As shown in that figure, the system performs two test cycles in sequence—one for pump 13 and one for pump 131—and separately indicates the success or failure of each test cycle by means of the separate tri-color indicators 84 and 137.

The pump 13 is tested in the manner previously described in connection with test and monitoring system 30. As before, the occurrence of the first test cycle is governed by TEST CYCLE LATCH 100 which transitions to a SET state during the occurrence of a test cycle, and to a RESET state in the absence of a test cycle. TEST CYCLE LATCH 100 is periodically conditioned to a SET state by EVENT TIMER 101, which provides a momentary output signal after a predetermined time interval has lapsed following the most recent input applied to the timer. EVENT TIMER 101 may be set, for example, to generate a momentary output signal following a predetermined period of time, for example, seven days, or a like period after receipt of the most recent input signal, in either case the first test cycle (and the second test cycle of system 130), will occur at periods of not more than seven days. As before, it will be appreciated that a greater or lesser test interval may be set by EVENT TIMER 101 as desired by the user.

When TEST CYCLE LATCH 100 is in a SET state, a signal is also applied through AND gate 102 and solenoid driver circuit 103 to solenoid 52 of valve assembly 33 to condition the valve assembly to admit water to sump container 11. Water continues to be admitted until either TEST CYCLE LATCH 100 reverts back to a RESET state, as in the case of a successful test, or the high water float switch assembly 40 or another failure provides a signal to AND gate 102, in the case of an unsuccessful test.

When TEST CYCLE LATCH 100 is in a SET state, it provides an output signal which provides for an amber illumination by indicator 84. Also, TEST CYCLE LATCH 100 in its SET state resets TEST SUCCESSFUL LATCH 106, and TEST FAIL LATCH 111. This terminates the output of these components such that during a test cycle indicator 84 can only present an amber illumination.

As before, the output of TEST CYCLE LATCH 100 is also applied to TEST CYCLE TIMER 110 which times the duration of the test cycle and provides a momentary timeout output signal in the event the SET state of TEST CYCLE LATCH 100, and hence the test cycle of pump 13, exceeds a predetermined maximum time duration. In the event of this timeout, TEST CYCLE TIMER 110 conditions TEST FAIL LATCH 111 to a SET state, causing a red illumination of indicator 84. Also, the output of TEST CYCLE TIMER 110 causes TEST CYCLE LATCH 100 to be reset, thereby terminating the test cycle and extinguishing the amber illumination of indicator 84. The output of TEST FAIL LATCH 111 also conditions ALARM LATCH 115 to a SET state, thereby causing an audible alarm to occur. ALARM LATCH 115 can be reset by momentary actuation of RESET switch 87 in the manner previously described. RESET switch 87 also causes, through delay circuit 117, when held for an extended period of time, the reset of TEST CYCLE LATCH 100, TEST FAIL LATCH 111, and TEST SUCCESSFUL LATCH 106, as well as the to be described counterpart components associated with pump 131, thereby conditioning the system for a subsequent test of the two pumps. As before, a manual test of the first sump pump 13 can be initiated by TEST switch 85 through signal conditioning circuit 119 and OR gate 120.

The output of MOTOR CURRENT SENSOR 121 may provide a reset signal through signal conditioning circuit 122 to EVENT TIMER 101, causing that timer to begin a new timing period with each operation of the motor. The output of MOTOR CURRENT SENSOR 121 is also applied to signal conditioning circuit 123, which provides a momentary pulse upon the motor stopping. This pulse, signaling the completion of a successful test, is applied through OR gate 114 to reset TEST CYCLE LATCH 100 to terminate the test cycle. The same motor stop pulse also serves to condition TEST SUCCESSFUL LATCH 106 to a SET status to indicate a successful test of sump pump 13 by illuminating the green indication of indicator 84. A further function of motor current sensor 121 is to initiate a timeout period in MOTOR RUN TIMER 124. In the event pump 13 operates continuously for a period exceeding the timeout period of MOTOR RUN TIMER 124, the timer generates an output signal which resets TEST CYCLE LATCH 100 and conditions TEST FAIL LATCH 111 to a SET state. This causes the red illumination of indicator 84. Also, the output of MOTOR RUN TIMER 124 resets TEST SUCCESSFUL LATCH 106 to extinguish the green illumination of indicator 84 driven by that latch.

In the event sump pump 13 fails to operate, the eventual closure of high water sensing switch assembly 40 causes an inhibit signal to be applied to AND gate 102, preventing further operation of solenoid 82 and further fresh water from being admitted to sump container 11. Also, as before, the closure of high water level switch assembly 40 causes TEST SUCCESSFUL LATCH 106 and TEST CYCLE LATCH 100 to be conditioned to a RESET state, and TEST FAIL LATCH 111 to be conditioned to a SET state. Thus, a high water condition results in no further water being admitted through valve 33 to sump container 11 and any amber and green illuminations of indicator 84 are extinguished while causing a red illumination of indicator 84.

As with the control module of system 30, the control module of system 130 includes a conventional low voltage power supply 126 for supplying operating power to solenoid-actuated valve 33 and the various functional circuits of the controller. Power supply 126 includes a rechargeable battery 127 to supply operating power to the control module component in the event of AC power failure. During normal operation AC power is supplied to power supply 126 through AC power cable 44 and an internal protective fuse 128.

The status of TEST FAIL LATCH 111 and TEST SUCCESSFUL LATCH 106 as to sump pump 13 is provided to external communications module 50 through connector 48.

Additional status information, including the serial number of the system and the time and nature of an event occurrence, can also be provided to the communications module through this connector.

To accommodate testing and monitoring of the second sump pump 131, one embodiment of the dual pump test and monitoring system 130 of the disclosure incorporates additional circuitry within control module 136. As shown in FIGS. 13A and 13B, the occurrence of a test cycle for the second pump 131 is determined by a second TEST CYCLE LATCH 140 (FIG. 13B) which transitions to a SET state during the occurrence of a test cycle for pump 131, and to a RESET state in the absence of such a test cycle.

In accordance with the present disclosure, TEST CYCLE LATCH 140 is conditioned to a SET state by TEST CYCLE LATCH 100 upon that device completing a test cycle for sump pump 13. To that end, the output of the latch is applied to the SET input of latch 140 through a signal conditioning pulse circuit 93.

When TEST CYCLE LATCH 140 is in a SET state, a signal is applied through AND gate 142 and solenoid driver circuit 143 to the solenoid 52 of valve assembly 33 to cause the valve assembly to admit fresh water to sump container 11. Fresh water continues to be admitted until either TEST CYCLE LATCH 140 reverts back to a RESET state, as in the case of a successful test, or the high water float switch assembly 40 provides an inhibit signal to AND gate 142, in the case of an unsuccessful test.

When TEST CYCLE LATCH 140 is in a SET state, it also provides an output signal which provides an amber illumination by indicator 137 through AND gate 144 and LED driver 145. Also, the TEST CYCLE LATCH 140 in its SET state resets a TEST SUCCESSFUL LATCH 146 through a signal conditioning pulse circuit 147 and OR gate 148. This terminates the output of TEST SUCCESSFUL LATCH 146 such that the green illumination of indicator 137 driven through LED driver 149 is extinguished. Thus, only the amber illumination of indicator 137 is present during a test cycle.

The output of TEST CYCLE LATCH 140 is also applied to a TEST CYCLE TIMER 150 which times the duration of the test cycle and provides a momentary timeout output signal in the event the SET state of TEST CYCLE LATCH 140, and hence the test cycle of pump 131, exceeds a predetermined maximum time duration. In the event of this timeout, TEST CYCLE TIMER 150 conditions TEST FAIL LATCH 151 to a SET state through an OR gate 152. This causes the red illumination of indicator 137 through AND gate 155 and LED driver 153. Also, the output of TEST CYCLE TIMER 150 causes TEST CYCLE LATCH 140 to be reset by means of a signal provided through OR gate 154, thereby extinguishing the amber illumination of indicator 137. The output of TEST FAIL LATCH 151 also conditions ALARM LATCH 115 to a SET state through a signal conditioning pulse circuit 156 and OR gate 97, thereby causing an audible alarm to occur. Alarm latch circuit 115 can be reset by momentary actuation of RESET switch 87, in the manner previously described. RESET switch 87 also causes, through delay circuit 117, when held for an extended period of time, the reset of TEST CYCLE LATCH 140, TEST FAIL LATCH 151, and TEST SUCCESSFUL LATCH 146, thereby conditioning the system for a subsequent test of pump 131. A manual test of the first and second pumps can be initiated by TEST switch 85 through signal conditioning circuit 119 and OR gate 120.

The output of MOTOR CURRENT SENSOR 161 is applied to signal conditioning pulse circuit 163, which provides a momentary pulse upon the motor stopping. This pulse, signaling the completion of a successful test, is applied through OR gate 154 to reset TEST CYCLE LATCH 140 to terminate the test cycle for second pump 131. The same motor stop pulse also serves to condition TEST SUCCESSFUL LATCH 146 to a SET status to indicate successful completion of a test cycle by illuminating the green indication of indicator 137. A further function of motor current sensor 161 is to initiate a timeout period in MOTOR RUN TIMER 164. In the event pump motor 113 operates continuously for a period exceeding the timeout period of MOTOR RUN TIMER 164, the timer generates an output signal which resets TEST CYCLE LATCH 140 through OR gate 154 and conditions TEST FAIL LATCH 151 to a SET state through OR gate 152. This causes the red illumination of indicator 137 through LED driver 153. Also, the output of MOTOR RUN TIMER 164 resets TEST SUCCESSFUL LATCH 146 through OR gate 148 to extinguish the green illumination of indicator 137 driven by that latch through LED driver 149.

In the event pump motor 131 fails to operate, the eventual closure of high water sensing switch assembly 40 causes an inhibit signal to be applied to AND gate 142, preventing further operation of solenoid 52 to prevent further fresh water from being admitted to sump container 11. Also, the closure of high water level switch assembly 40 causes a pulse to be applied through signal conditioning pulse circuit 165 and OR gate 148 to reset TEST SUCCESSFUL LATCH 146, and through OR gate 154 to reset TEST CYCLE LATCH 140, and through OR gate 152 to condition TEST FAIL LATCH 151 to a SET state. Thus, a high water condition results in no further water being admitted through valve 33 to sump container 11 and any amber and green illuminations of indicator 137 are extinguished while causing a red illumination of indicator 137. As previously described in connection with the single pump system 30, a FLASHER CIRCUIT 172 may be provided to cause a flashing red illumination of indicator 137 prior to actuation of RESET switch 87, and a FLASHER CIRCUIT 173 may be provided to cause a flashing amber illumination of indicator 137 when TEST CYCLE LATCH 140 is SET and valve 33 is open.

The status of TEST FAIL LATCH 151 and TEST SUCCESSFUL LATCH 146 is provided to external communications module 50 (not shown in FIG. 13) through connector 48. Additional status information related to pump 131, including the time and nature of an event occurrence, can also be provided to the communications module through this connector.

To provide for sequential testing of pumps 31 and 131, the AC supply circuit to the pump motors includes single pole normally closed relays 168 and 169 and associated respective relay driver circuits 170 and 171. When TEST CYCLE LATCH 100 is in a SET state to test the motor of pump 13, relay 168 associated with pump 131 is energized open, preventing the motor of pump 131 from operating. Subsequently, when TEST CYCLE LATCH 140 is in a SET state to test the motor of pump 131, relay 169 associated with pump 13 is energized open, preventing the operation of the motor of pump 13. Thus, each motor of each pump is independently tested.

Figure 14:
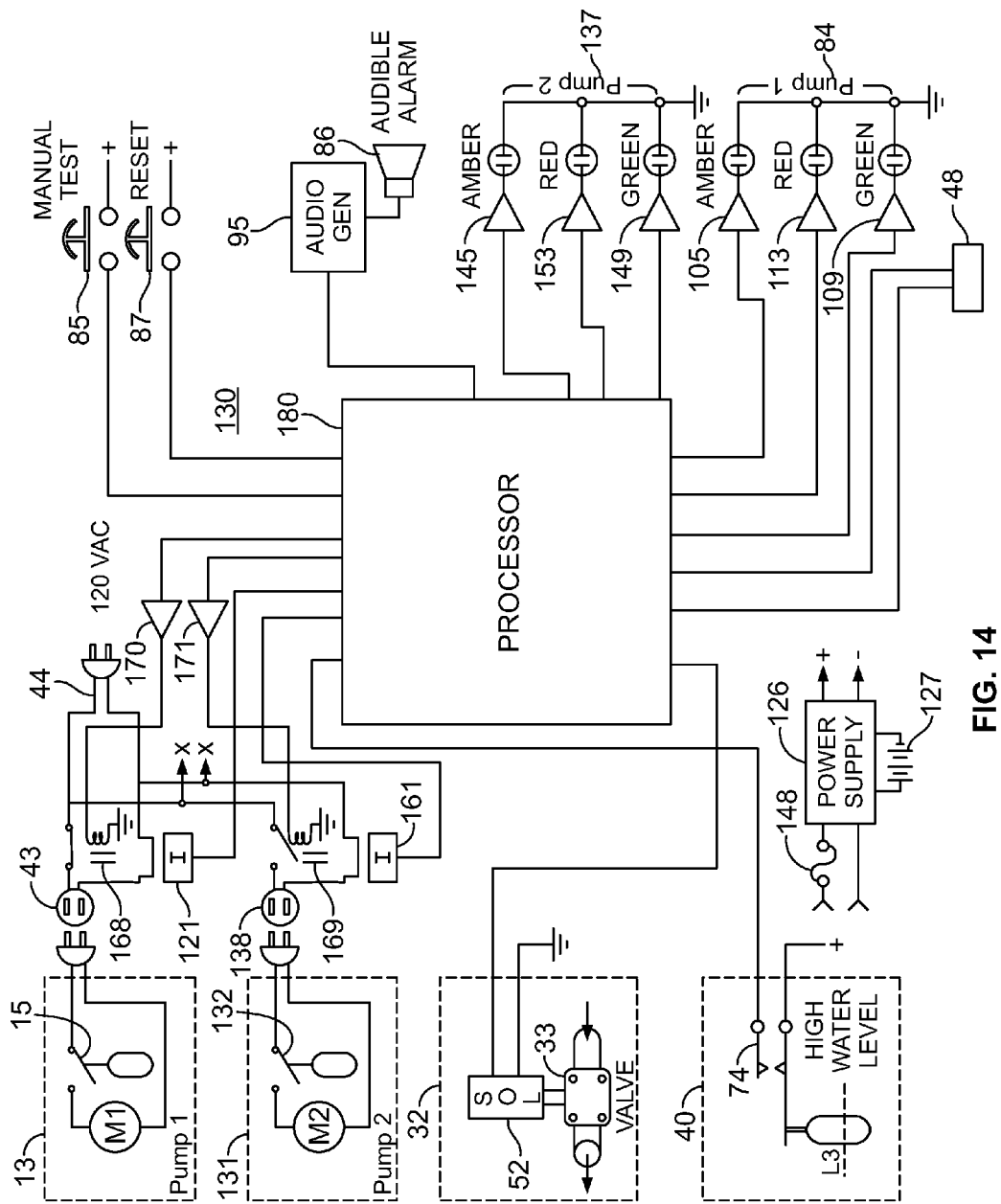
FIG. 14 is a simplified functional block diagram partially in schematic form showing the implementation of the sump pump test and monitoring system of FIG. 13 utilizing a microprocessor.

Referring to FIG. 14, many of the functions heretofore described with respect to FIG. 13 can be more efficiently accomplished by a microprocessor implementation of the control system. In particular, a single microprocessor 180 can be provided with the various sensing and control inputs previously described and programmed to carry out the logic and timing functions required by the system. Previously described outputs to cause the green, red and amber illuminations of indicators 84 and 137 can be provided by processor 180 as well, as can the necessary data required for bi-directional communication through communication port 48 to external communications module 50 (not shown in FIGS. 13 and 14). The programming of microprocessor 180 is well within the capabilities of one skilled in the art of microprocessors and the preparation of associated firmware and software.

Thus, each of the two pumps 13 and 131 in sump container 11 is individually monitored and the successful or unsuccessful test of each pump is separately indicated. Additional reporting is provided to communications module 50 to indicate the status of each pump. Visual and aural warnings are given in the event that either pump 13 or pump 131 is inoperative. Thus, the dual pump system 130, like the single pump system 30, is fully automated and proactively provides the user with a warning of pump failure prior to the pump actually being required for evacuating ground water from the pump reservoir. As before, it is contemplated that additional functions, such as power failure or low battery, or a low temperature condition in the environment of the pump system can also be communicated by means of the communications module. The communications module may communicate with the user by means of an internet connection, a cellular data connection, a phone connection, or by means of a hardwired connection to a separate building alarm system, to the owner or one or more persons designated by the owner of the system.

The information given to the user can include the time and date of the successful tests, the time and date of unsuccessful tests and additional information such as power failure or temperatures falling below a predetermined level. The information can be copied or redirected to multiple destinations and users, including plumbing and property management services. The system can be readily installed in conventional single and dual sump pump installations without modification to the pump mechanisms, or the physical construction of the pump reservoir or associated plumbing. Moreover, the system is the completely fail safe in that the monitored pumps will continue to operate in a normal manner in the event of removal or complete inoperability of the test and monitoring system.

Figure 15:
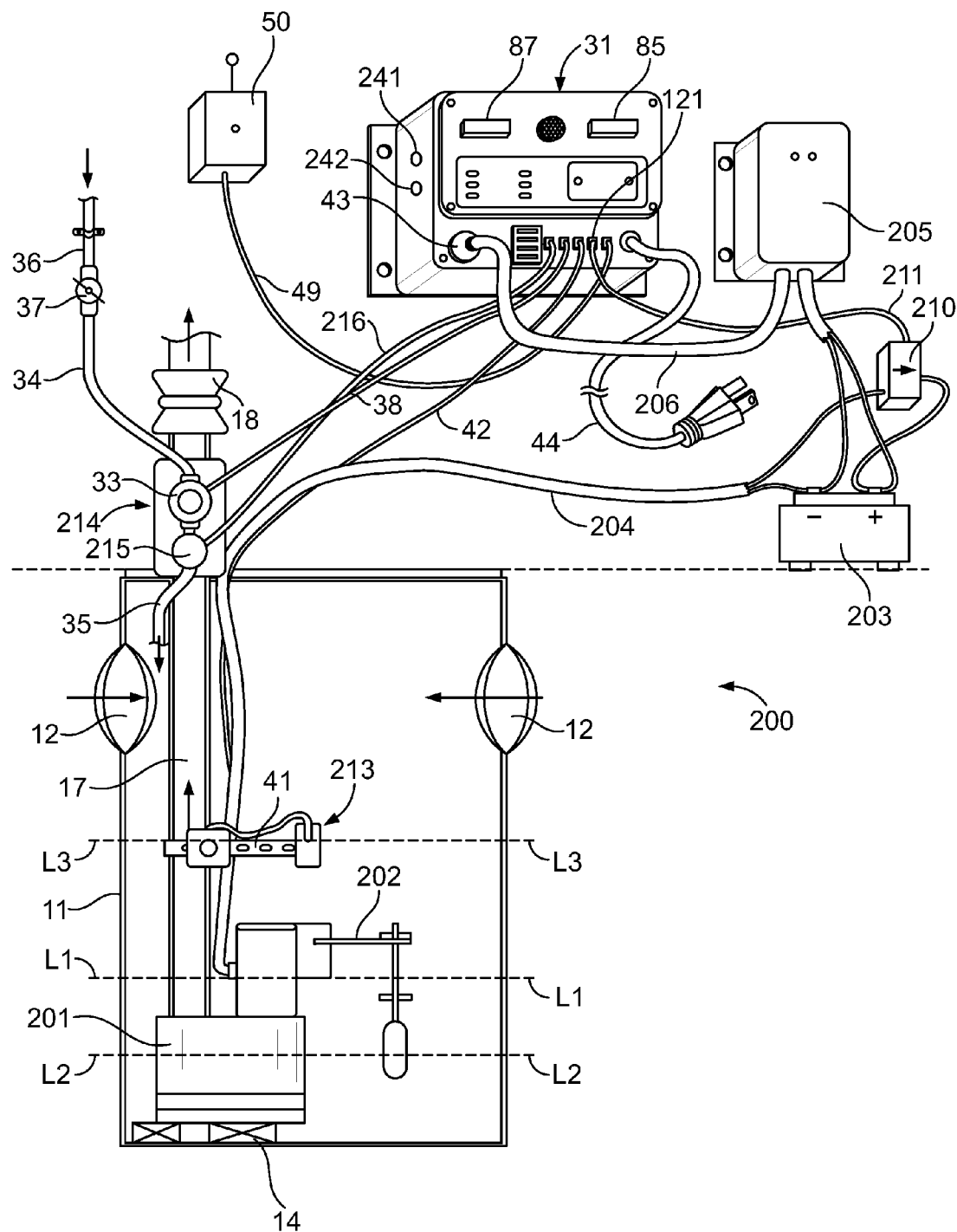
FIG. 15 is a simplified cross-sectional view partially in perspective of a sump pump test and monitoring system constructed in accordance with the present disclosure and having a liquid container, a single battery-powered sump pump, an improved electrically-actuated valve assembly, an improved float switch assembly and a current probe assembly for rising current supplied to the pump motor.

The sump pump test and monitoring systems described in this disclosure can also be adapted to monitor sump pump installations which utilize a battery-powered DC sump pump. One such system, which includes additional enhancements to the valve module 32 and liquid level sensor module 40, is shown in FIG. 15.

The system 200 tests and monitors a DC-powered pump 201 having a conventional float switch 202 which causes the pump to operate when the liquid level in sump container reaches level L1, and terminates pump operation when the liquid level in the container falls to level L2 as a result of the pump discharging water through discharge pipe 17. Pump 201 is connected to and receives DC operating power from a conventional battery 203 through a two conductor cable 204. The battery is maintained charged by an AC-powered charger 205, which receives AC operating power through an AC line cord 206 having a conventional end plug inserted into receptacle 43 of a test control module 207, which is similar to the previously described test control module 31 utilized with AC-powered sump pump 13. Test control module 207 is connected to an AC receptacle by an AC line cord 44.

To monitor the current drawn by DC motor 201, system 200 includes a current probe module 210 which clamps over one of the conductors in cable 204 which supplies current to motor 201. Current probe module 210 is connected to a connector 212 on control module 207 by a cable 211, which provides a signal to the circuitry of control module 207 which indicates the current supplied by battery 203 to the motor.

When conducting a test, test and monitoring system 200 supplies an actuating signal to valve module 33 through cable 38, causing fresh water to be admitted to sump container 11. When the liquid level in the container rises to level L1, motor 201 operates. This increase in current the motor is detected by current probe module 210, and hence control module 207, causing the control module to terminate the actuating signal to valve 33 to stop the flow of fresh water into the container. As liquid is evacuated from container 11 by pump 201, the liquid level falls to L2, and the pump stops. The termination of current to the motor is interpreted as a successful test by control module 207, resulting in pump status indicator 84 lighting a steady green to indicate a successful test.

Should sump pump 201 fail to function, the liquid level in the sump reservoir will continue to rise to level L3, causing a high liquid level sensor module 213 to send a signal to control module 207 through cable 42. This causes control module 207 to interrupt the actuating signal to valve 33 to terminate water flow into the sump container and cause LED indicator 84 to light red, indicating a pump failure. As in the previously described sump pump test and monitoring system, a communications module 50 connected to control module 207 by a cable 49 may provide notification of the pump failure at one or more user-designated remote locations.

Figures 16, 17:
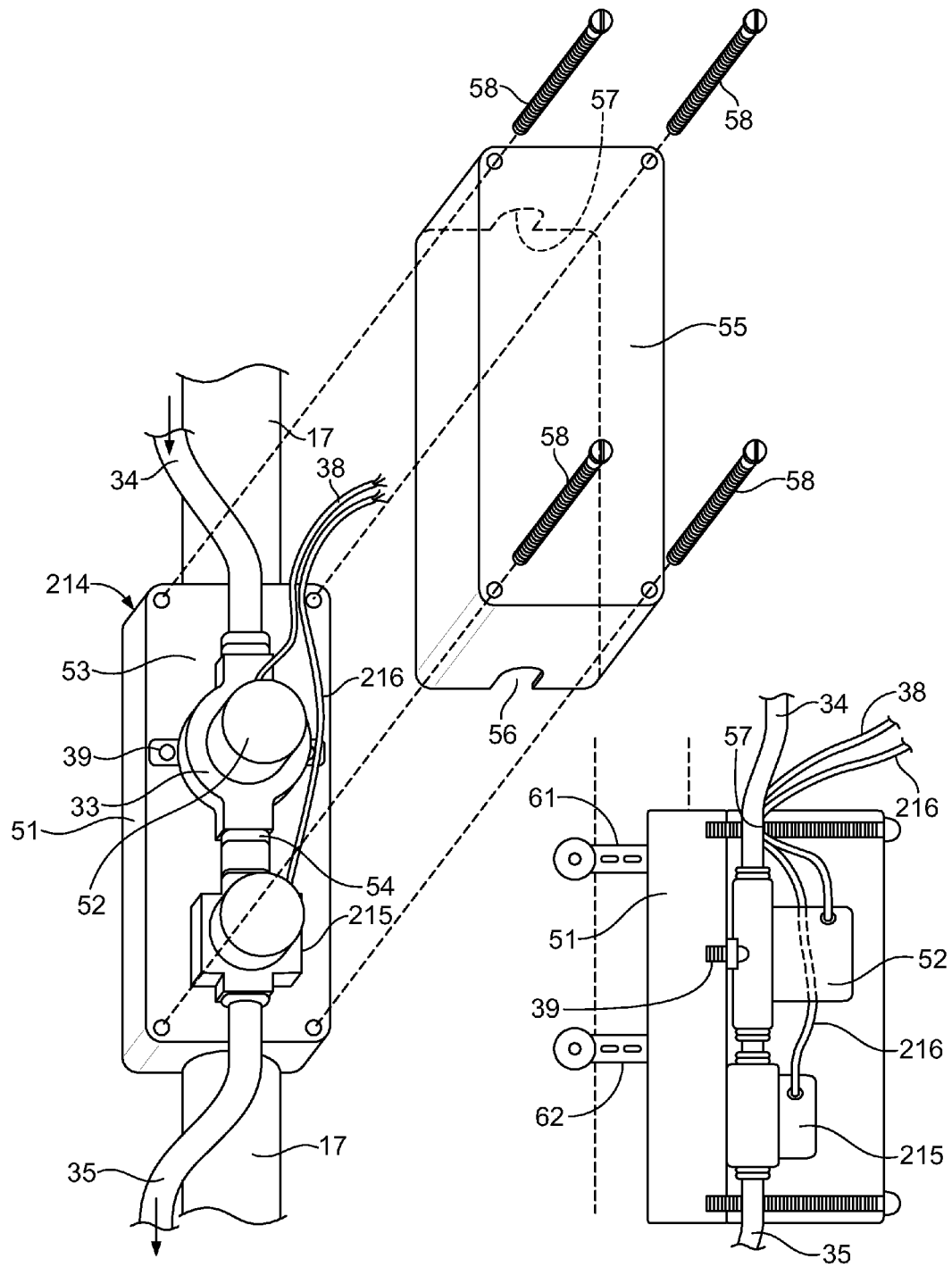
FIG. 16 is an enlarged perspective view of the improved electrically-actuated valve assembly of FIG. 15 showing the solenoid-actuated valve and flow sensor utilized therein.
FIG. 17 is a side elevational view partially in cross-section of the valve assembly of FIG. 16.

Referring to FIG. 16, sump pump test and monitoring system 200 incorporates an improved valve module 214 which provides additional valve monitoring functionality to the system. In particular, valve module 214 includes, in addition to the solenoid valve 33, a liquid flow sensor 215 which generates a signal indicating of the actual flow rate of fresh water through the valve. This signal is communicated through a cable 216 to a dedicated connector 217 on control module 207. In accordance with another aspect of the disclosure, circuitry within the control module utilizes the flow rate to confirm the proper operation of valve 33. When control module 207 applies an actuating signal to the valve, the output signal from flow sensor 215 is utilized to confirm that the valve has opened and that fresh water is entering the sump container. When the actuating signal is removed from the valve, closure of the valve and termination of fresh water flow is confirmed by the output signal of the flow sensor indicating no flow. In the event that either valve condition is not confirmed by the flow sensor, any test in progress is terminated and a valve fault is signaled by control module 207. As with valve module 32, a cover 56 is secured over the valve and flow sensor to protect the assembly from damage.

Figure 18:
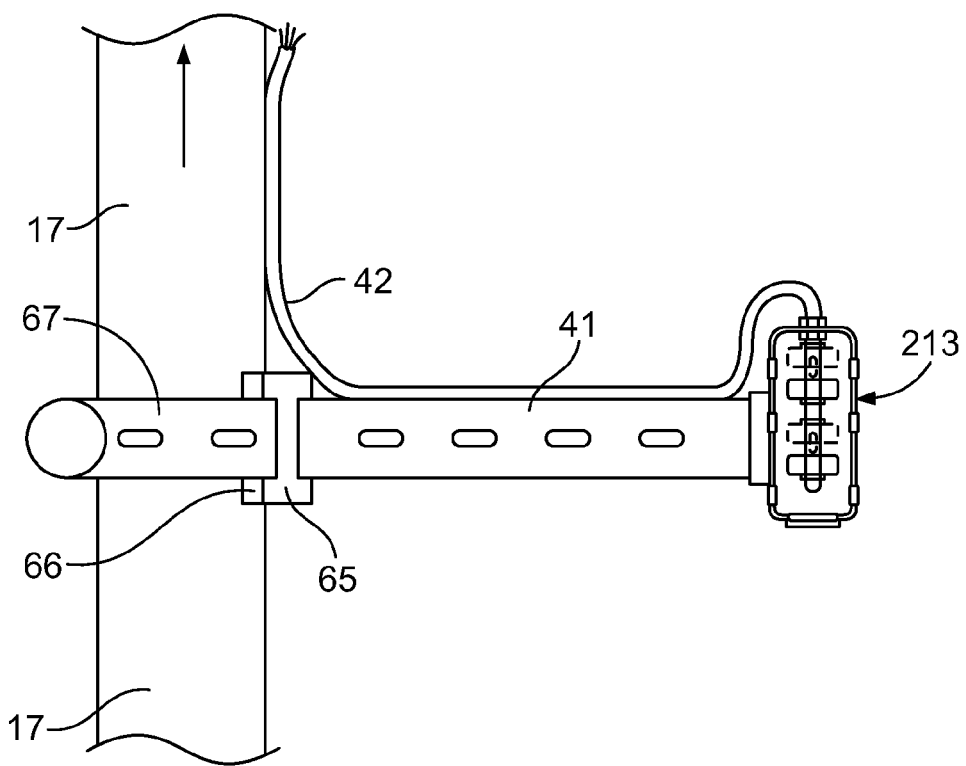
FIG. 18 is a side elevational view partially in cross-section of the improved float switch assembly of FIG. 15 showing the independently sensed dual float switches utilized therein.
Figure 19:
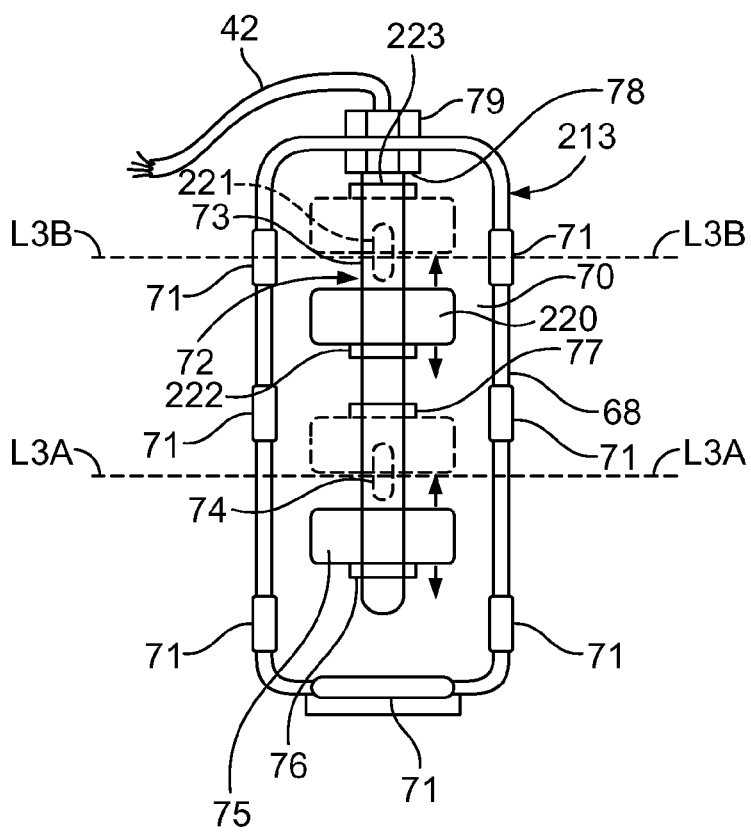
FIG. 19 is an enlarged rocs-sectional view of the dual float switches and common switch housing utilized in the float switch assembly of FIG. 18.

The improved liquid level sensor module 213 utilized in sump pump test and monitoring system 200 is illustrated in FIGS. 18 and 19. As with the previously described sensor module 40, module 213 is mounted by a bracket 41 secured to discharge pipe 17 by a block 65 and strap 67. A generally cylindrical housing 68 having a plurality of perforations 71 forms a compartment 70. Within this compartment, two donut-shaped float members 75 and 220, each having an internal toroidal permanent magnet (not shown), are arranged to slide along a hollow non-magnetic stem 73 within which two magnetically-actuated reed switches 74 and 221 are positioned, one above the other. Float member 75 is constrained to slide between two fixedly-positioned washers 76 and 77 as the liquid level in the container rises. Reed switch 74 is positioned within stein 73 such that the magnet in member 75 actuates the switch when the member reaches washer 77. Similarly, float member 220 is constrained by fixedly positioned washers 222 and 223 so that reed switch 221 is actuated by the magnet in float member 220 when the rising liquid level causes that member to reach washer 223. As will be described subsequently in conjunction with FIG. 28, the presence of the independently connected switches achieves, in accordance with another aspect of the disclosure, self-monitoring and redundancy in liquid level sensor module 213 for improved reliability.

Figure 20:
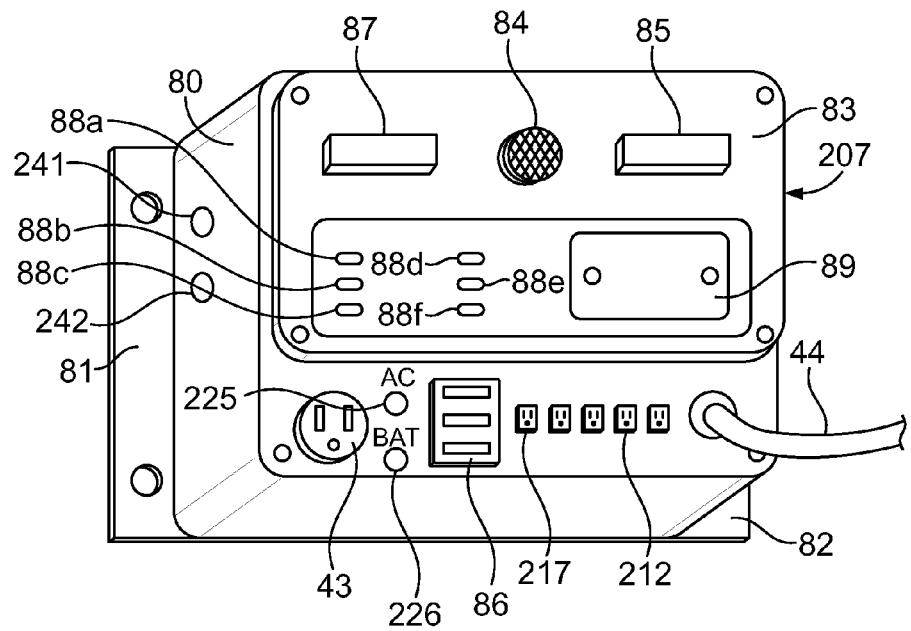
FIG. 20 is an enlarged perspective view of the control module of the sump pump test and monitoring system of FIG. 15 adapted for mounting on a wall or other flat surface.
Figure 21:
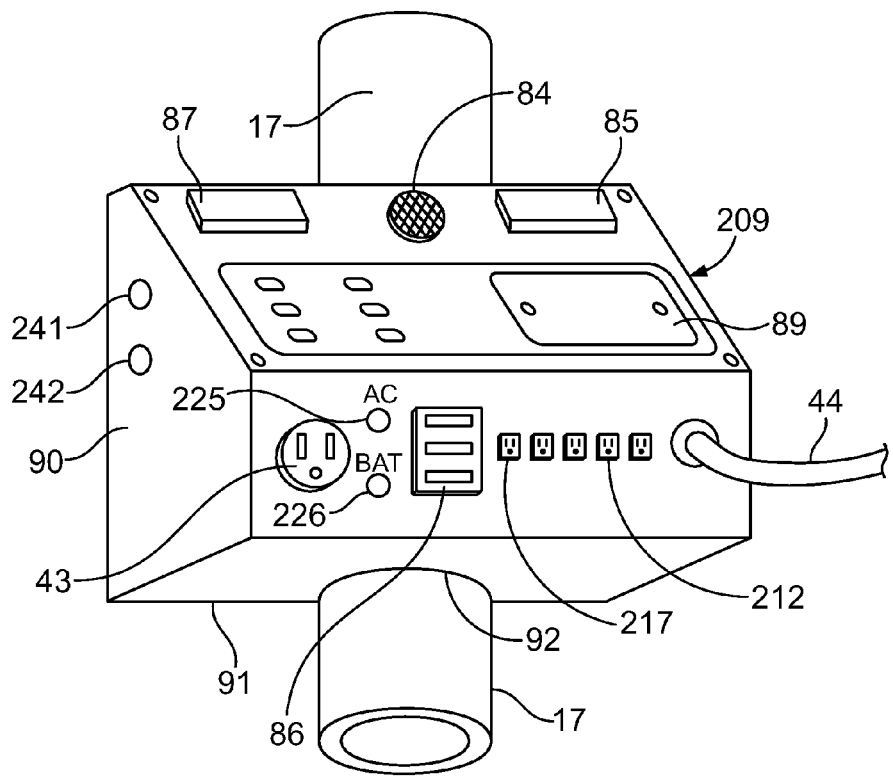
FIG. 21 is an enlarged perspective view of an alternate construction for the control module of FIG. 20 adapted for mounting directly on the discharge pipe of the sump pump installation.

Referring to FIG. 20, test control module 207 is seen to include an additional socket 217 for connecting to flow transducer 215 through cable 216, and an additional socket 212 for connecting to current probe module 210 through cable 211. In addition, module 207 includes two mode-indicating blue LEDs 225 and 226 which indicate the operating mode of the controller, LED 225 indicating when lit that the controller is configured to test and monitor an AC sump pump connected to receptacle 43 by means of an internal current sensor 121 (FIG. 22) associated with the receptacle, and LED 226 indicating when lit that the controller is configured to test and monitor a battery-powered DC pump connected to receptacle 43 by means of external current probe 210. Except for the additions, control module 207 is essentially identical to the previously described control module 31. And, as with control module 31, the housing of control module 207 can be alternatively adapted for mounting to the pump discharge pipe 17, as shown in FIG. 21.

Figure 22:
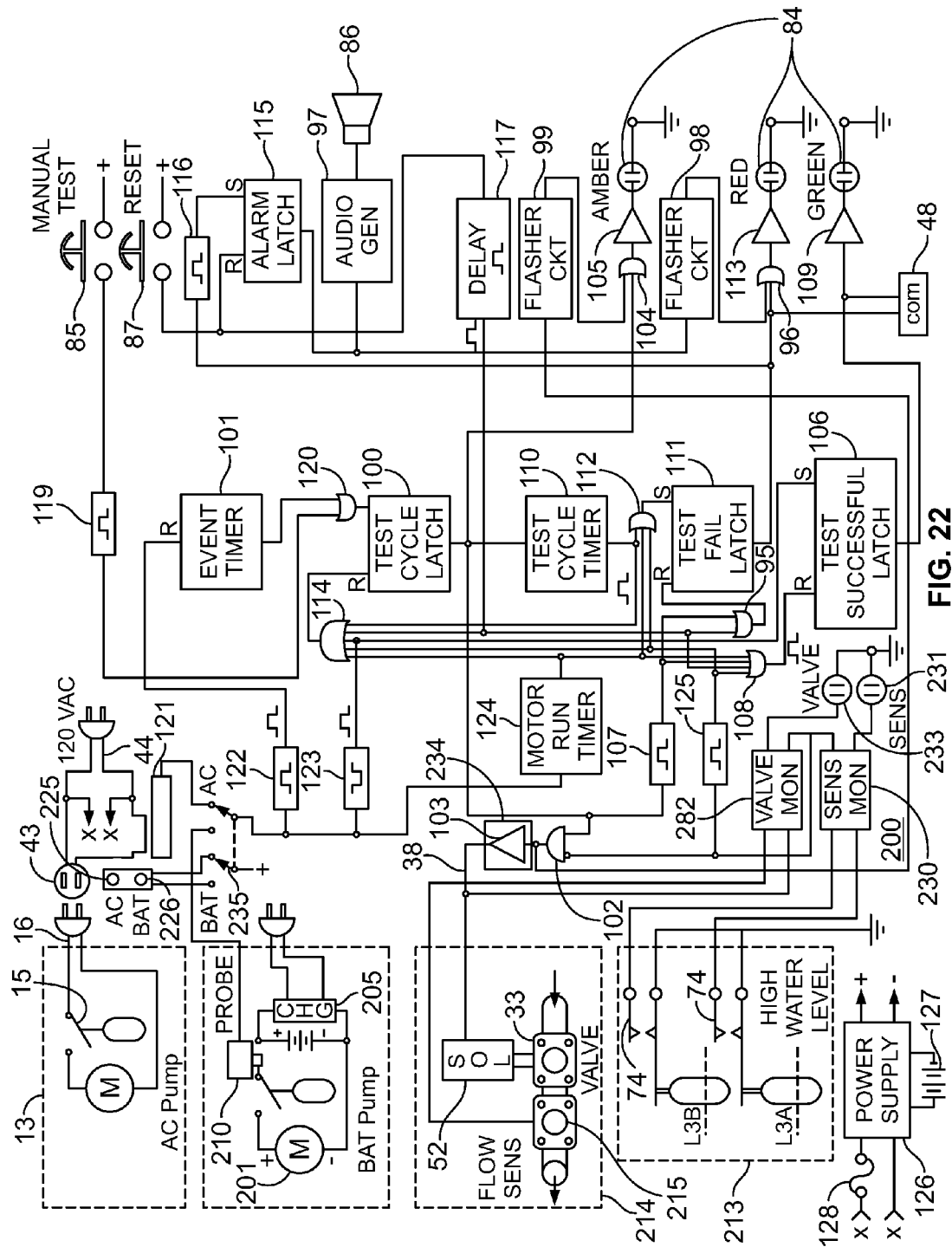
FIG. 22 is a simplified functional block diagram partially in schematic form showing the principal components of the test and monitoring system of FIG. 15.

Referring to FIG. 22, sump pump test and monitoring system 200 is seen to be structurally and functionally similar to system 30, except for the improved liquid level sensing module 213, the improved valve module 214, current probe 210 and the additional components required to implement these features and monitor a battery-powered DC pump. In particular, switches 74 and 221 of liquid level sensing module 213 are connected to a sensing module monitor circuit 230, wherein the sequencing of the switches is monitored and a fault signal is produced for inhibiting operation of valve 33 and for lighting an LED indicator 231 in the event of a malfunction. This monitoring circuitry is described in detail in connection with FIG. 28.

Furthermore, valve module 214 requires additional valve-monitoring circuitry 232 to receive the output of flow sensor 215 and compare that with the status of valve 33. In the event of no flow when the valve is actuated open, or in the event of flow when the valve is not actuated open, fault signals are generated which illuminate an LED 233 and inhibit the further application of an actuating signal to the valve. An additional protective circuit 234, described in conjunction with FIG. 34, may be provided with valve driver circuit 103 to prevent the valve from being inadvertently actuated in the event of a malfunction in other components, including processor 240 (FIG. 23), for the reliable operation of valve 33.

To provide for motor current being sensed by current probe module 210 when the system is monitoring a battery-powered DC motor, a two-pole two-position mode switch 235 switches between the internal sensor 121 associated with receptacle 43 and the external current probe module 210. Indicators 225 and 226 are correspondingly illuminated by this switch to indicate the mode selected. It is intended that mode switch 235 will be set by the installer of system 200 by sequential actuation of a mode select push button switch (241) at the time of installation.

Figure 23:
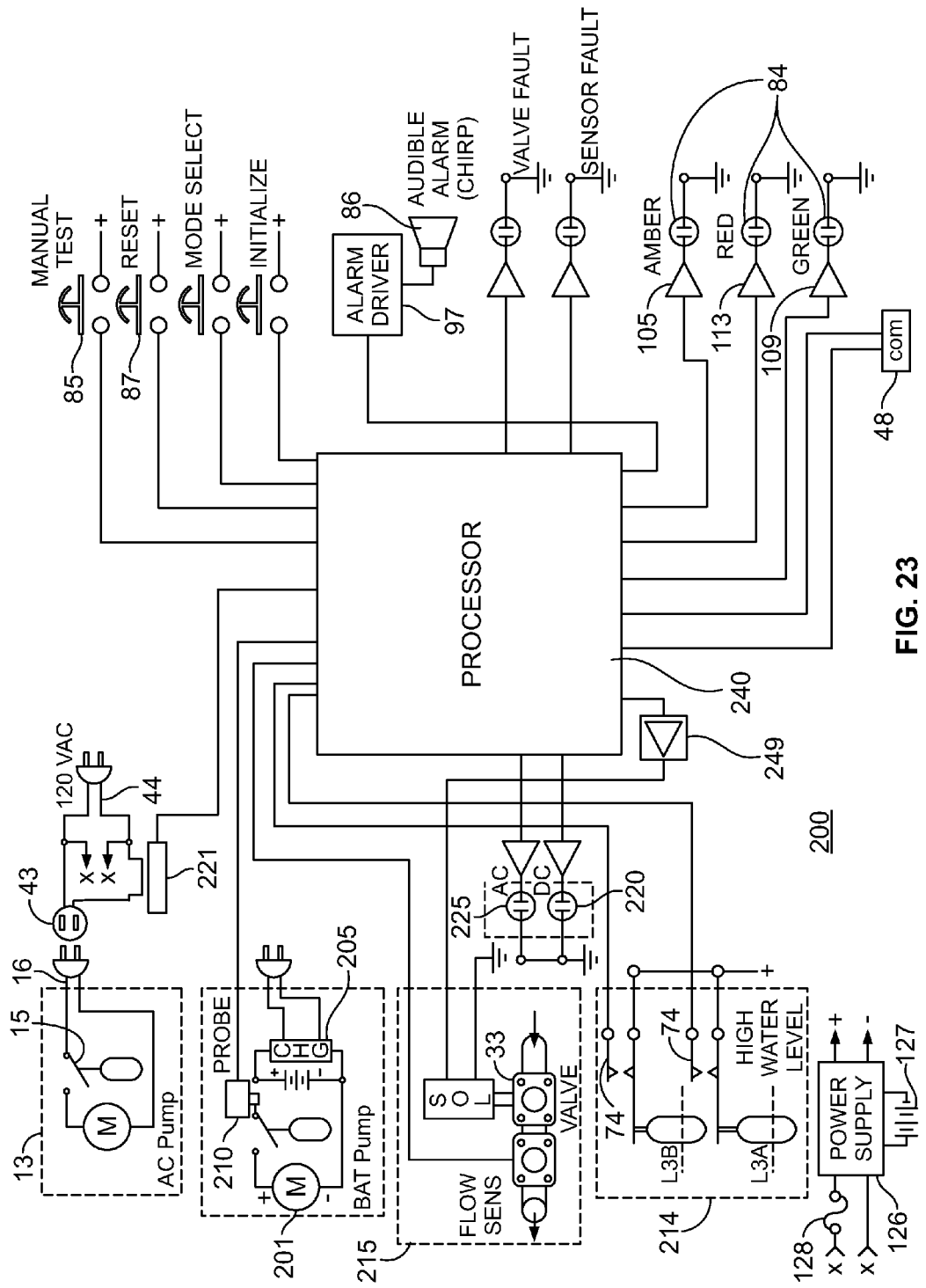
FIG. 23 is a simplified functional block diagram partially in schematic form showing the implementation of the test and monitoring system of FIG. 15 utilizing a microprocessor.

Referring to FIG. 23, the sump pump test and monitoring system 200 described in FIG. 22 can be efficiently implemented using a microprocessor 240. In this implementation, push-button switch 241 is utilized to switch between the AC pump monitoring mode and the DC pump monitoring mode, in the manner of mode switch 235 (FIG. 22). Also, another push-button switch 242 may be optionally provided to initialize the system, in a manner to be described in conjunction with FIG. 31. Processor 240 can be programmed using conventional programming techniques by someone of ordinary skill in the computer programming arts.

Figure 24:
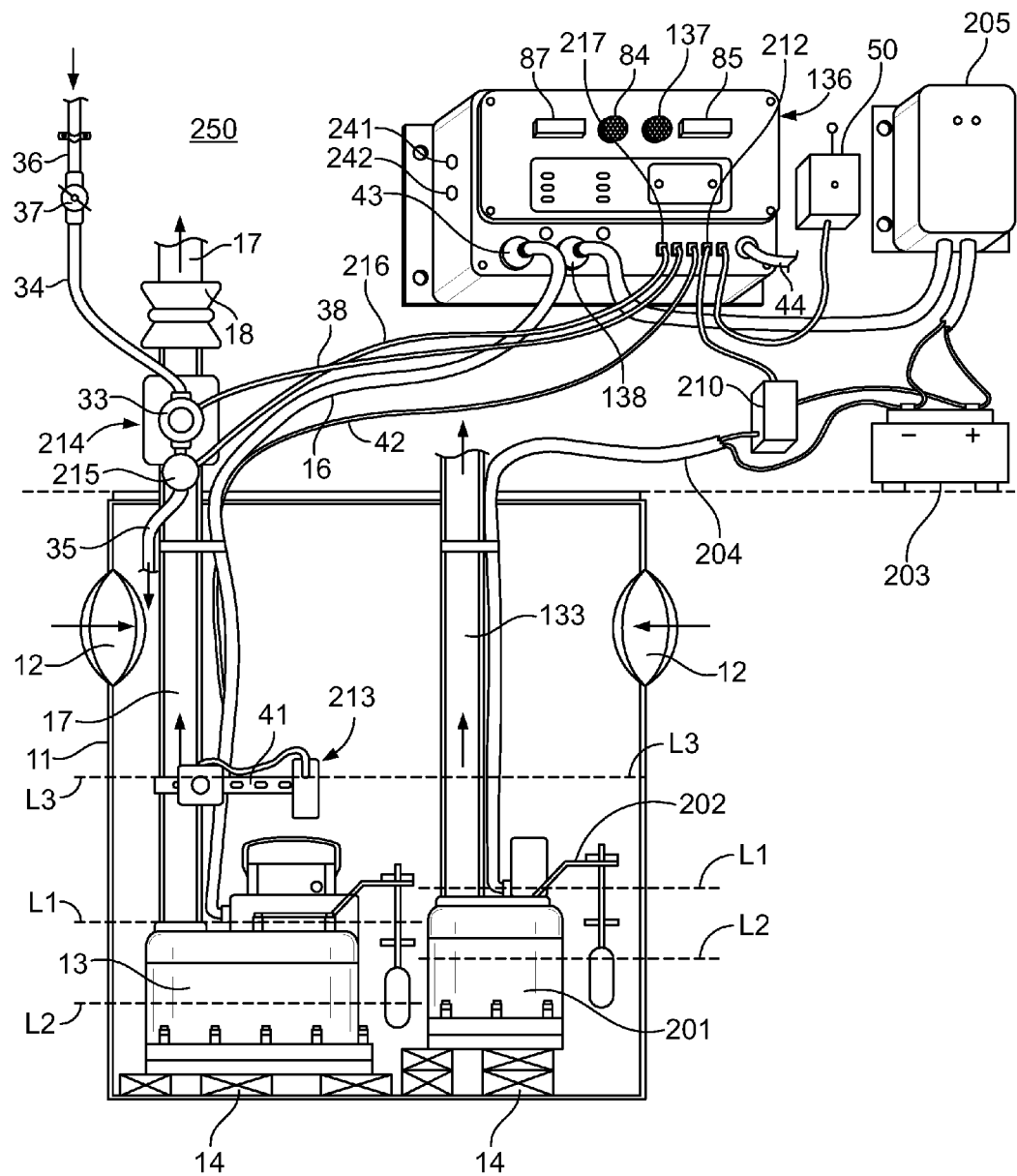
FIG. 24 is a simplified cross-sectional view partially in perspective of a sump pump test and monitoring system constructed in accordance with the present disclosure and similar to the system of FIG. 15 except utilizing an AC-powered pump and a battery-powered pump.
Figure 25:
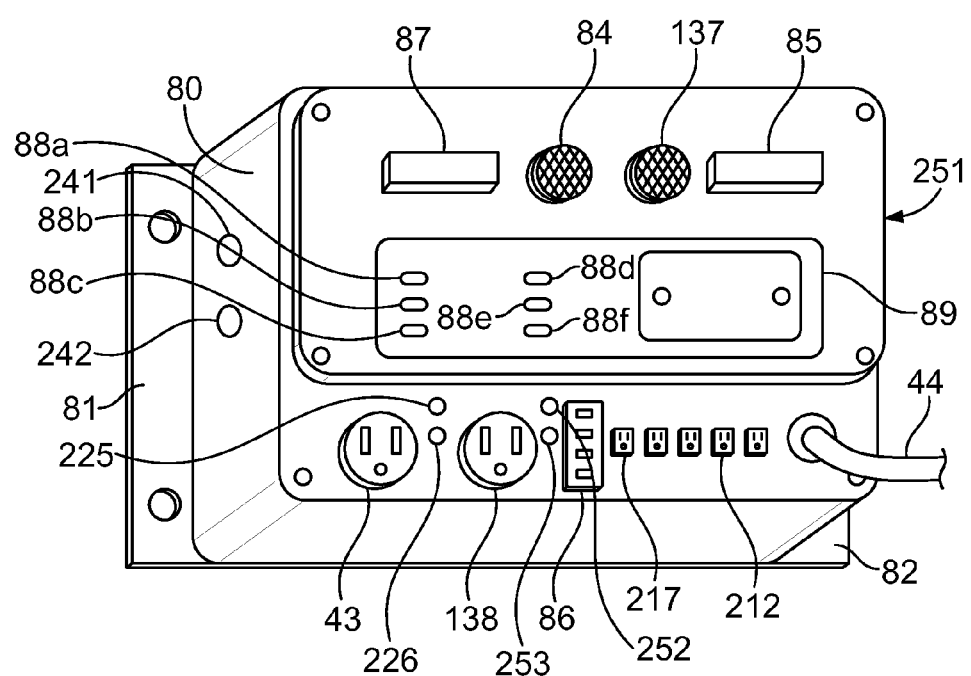
FIG. 25 is an enlarged perspective view of the control module of the sump pump test and monitoring system of FIG. 24.

Referring to FIG. 24, in accordance with another aspect of the disclosure, a sump pump test and monitoring system 250 is shown which simultaneously tests and monitors AC pump 13 and battery-powered DC pump 201. The system, except for the provision for DC pump 201, and the previously described improved liquid level sensor module 213, the previously described improved valve module 214 and the added current probe 210, and additional circuitry required to implement these features, is essentially similar to the previously described test and monitoring system 130. As shown in FIGS. 24 and 25, the control module 251 of the system includes a receptacle 138 for supplying power to a second pump, or in this case, to battery charger 205, and two connector sockets 212 and 217, for connecting to current probe module 210 and flow sensor 215, respectively. A second LED status indicator 137 is provided to indicate the status of a sump pump connected to receptacle 138. Push button switches 241 and 242 provide mode select and initialize functions, respectively. In the manner of the previously described control module 207, AC and BAT (DC) mode indicating LEDs are provided in association with AC receptacles 43 and 138. A pair of blue LED indicators 225 and 226 associated with receptacle 43, and a pair of blue LEDs 252 and 253 associated with receptacle 138, indicate AC and BAT (DC) modes, respectively.

Figure 26B:
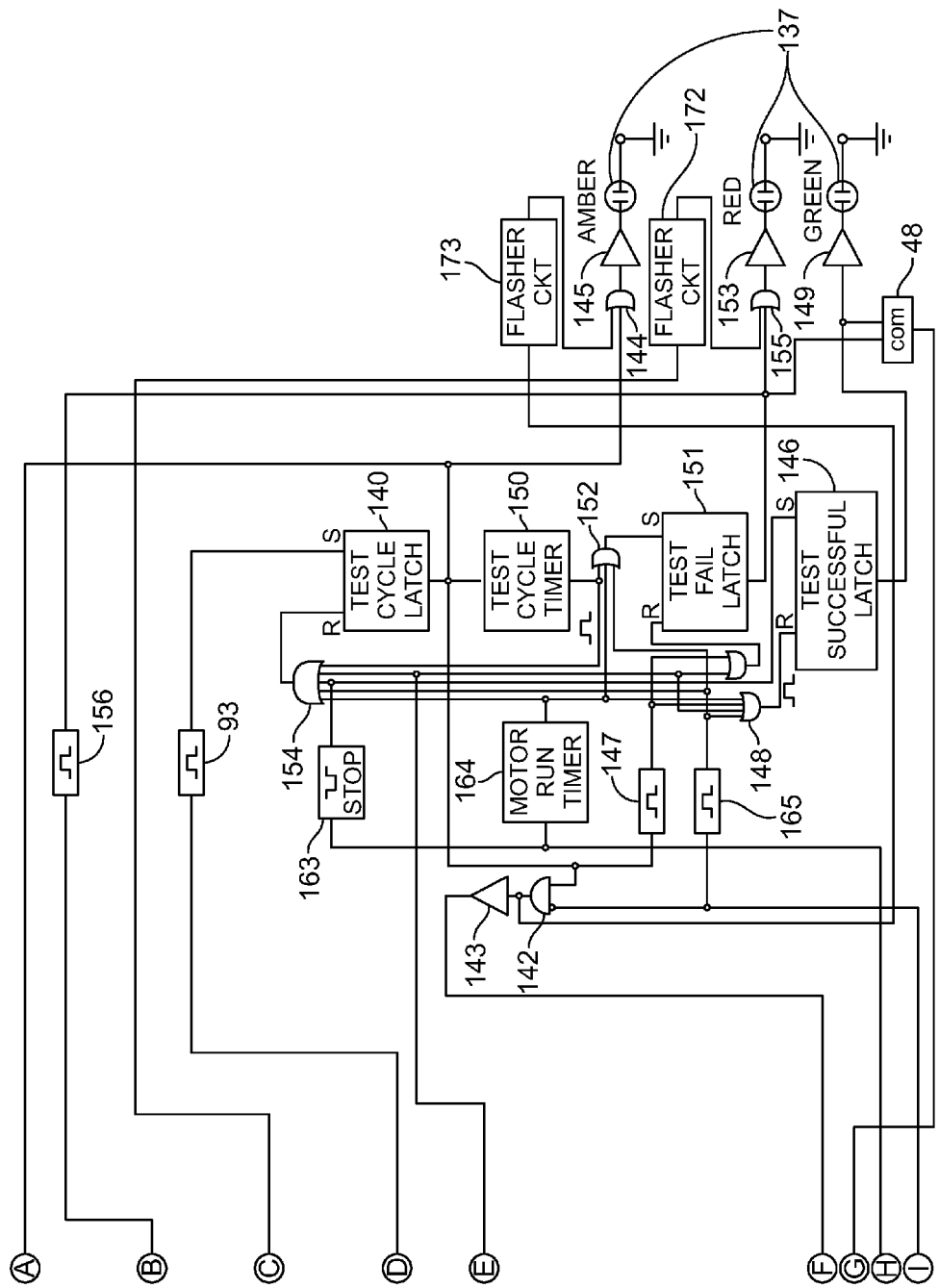

Referring to FIGS. 26A and 26B, the structure and functionality of sump pump test and monitoring system 250, except for the previously stated changes and additions, is similar to that of system 130. In particular, system 250 includes a two position mode selector switch 254 provided to select either AC or BAT modes for receptacles 43 and 138. Mode selector switch may include additional switch sections to actuate LED indicators 225, 226, 252 and 253 in accordance with the selected monitoring mode. In practice, various combinations of mode designations may be provided for the receptacles, such as, for example, AC or BAT for receptacle 43 with receptacle 138 not used, or AC for receptacle 43 and receptacle 138, or AC for receptacle 43 and BAT for receptacle 138. These selections can be accomplished by repeated momentary actuations of mode select switch 241 (FIG. 27).

Figure 27:
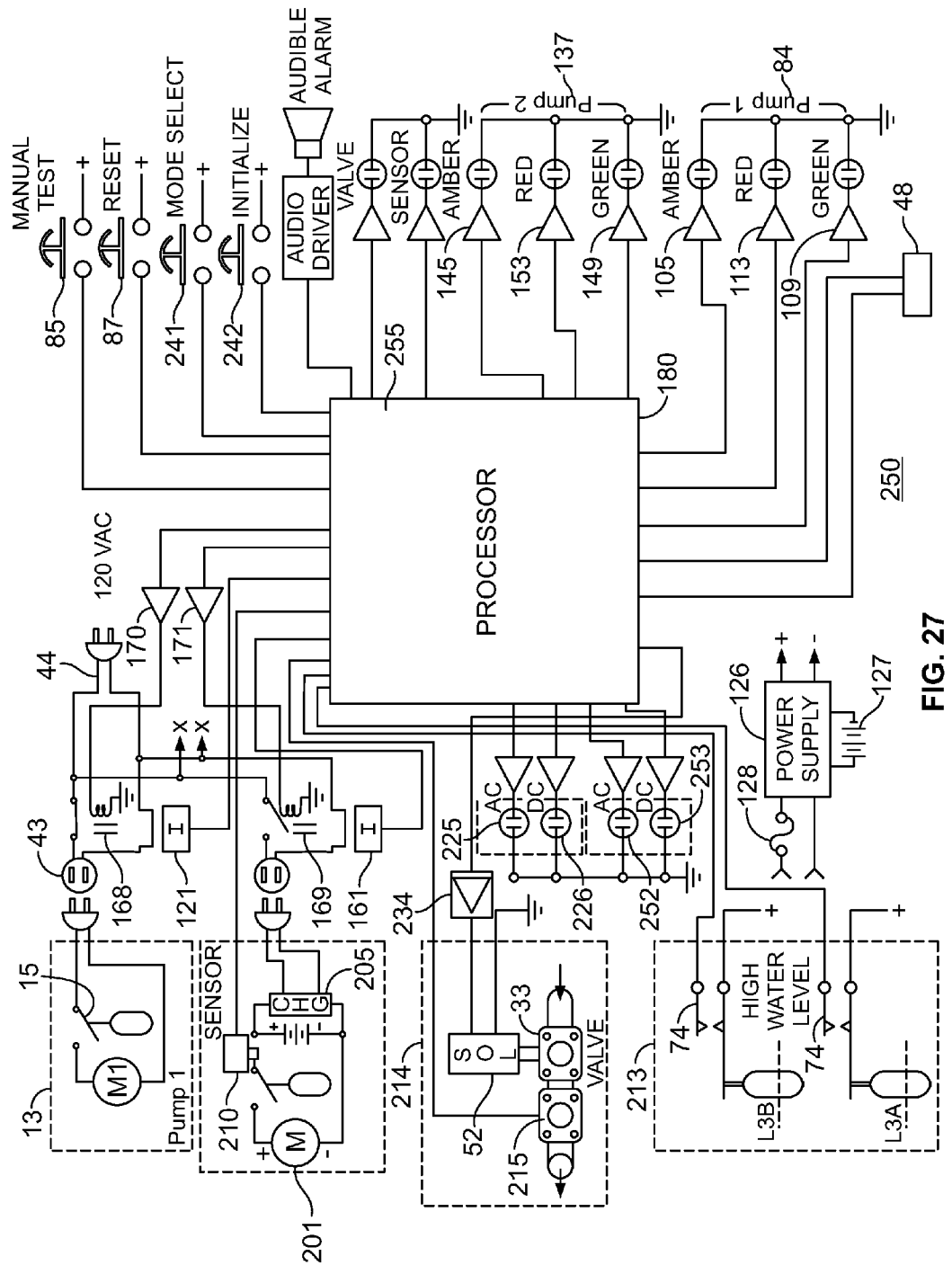
FIG. 27 is a simplified functional block diagram partially in schematic form showing the implementation of the test and monitoring system of FIGS. 26A and 26B utilizing a microprocessor.

As shown in FIG. 27, the functions of control module 251 in sump pump test and monitoring system 250 can be efficiently accomplished by utilizing a microprocessor 255. Processor 255 can be programmed using conventional programming techniques by a programmer of average skill in the computer programming arts.

Thus, system 250 as implemented in FIGS. 25-27 provides test and monitoring capability for both AC and battery-powered DC pumps in both single and dual pump installations. The system will automatically and periodically test installed pumps, providing an unambiguous indication of the status of each pump.

Figure 28:
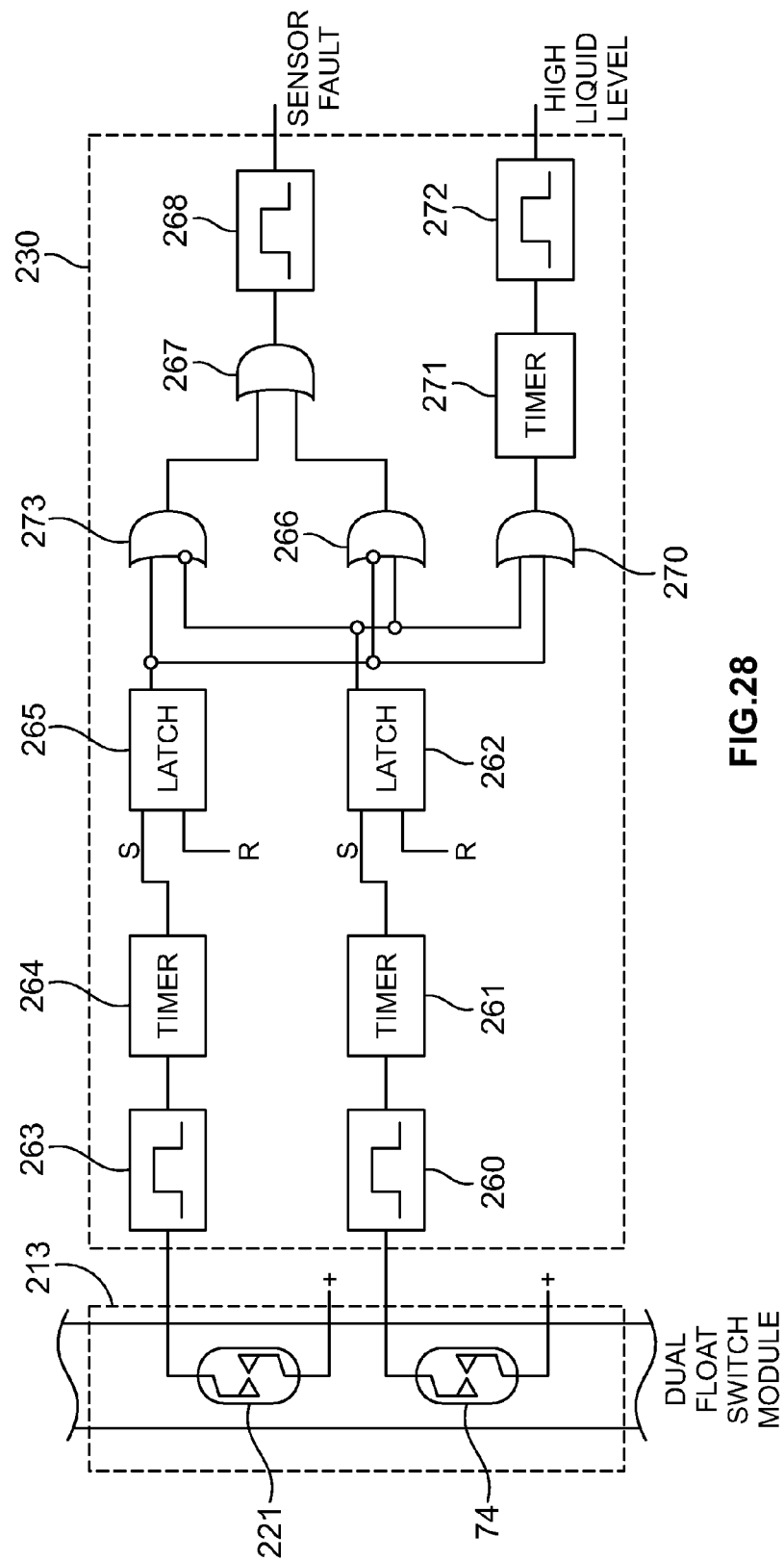
FIG. 28 is a simplified block logic diagram illustrating the circuitry associated with the liquid level sensing module shown in FIGS. 18 and 19.

Referring to FIG. 28, the dual float switches 74 and 221 provided in liquid level sensor module 213 provide, in combination with a monitoring circuit 230, protection against a float switch failure. In particular, reed switch 74 is connected through a signal conditioning pulse circuit 260 to a timer 261. After a first predetermined time out period, slightly in excess of the time nominally required for the liquid level in the sump container 13 to rise from a level actuating switch 70 to a level actuating switch 221, timer 261 provides an output pulse which conditions a latch circuit 262 to a SET state. Similarly, reed switch 221 is connected through a signal conditioning pulse circuit 263 to a timer 264, which after a very short predetermined time out period provides an output pulse to condition a latch circuit 265 to a SET state.

During a test cycle, as the liquid level in sump container 11 rises switch 74 is eventually actuated, conditioning latch 262 to a SET state after the time out period of timer 261. In the meantime, as the liquid level continues to rise switch 221 is actuated and latch 265 is conditioned to SET, after a much shorter delay period set by timer 264. If switch 221 has not actuated by the time out of latch 262, indicating a failure of switch 221, an AND gate 266 provides a sensor fault signal through an OR gate 267 and a signal conditioning pulse circuit 268. At the same time, the output of latch 262 provides a high liquid level output signal through an OR gate 270, short delay timer 271 and signal conditioning pulse circuit 272. In the event switch 221 is activated by the rising liquid level in sump container 11 but switch 74 has not been actuated, after the short time out period of timer 264 latch 265 is set and a sensor fault output is provided through an AND gate 273, OR gate 267 and signal conditioning pulse circuit 268. At the same time, the output of latch 265 provides a high liquid level output signal through OR gate 270, timer 271 and signal conditioning pulse circuit 272. Thus, with the monitoring circuit 230, failure of either one of the two reed switches 74 and 221 of liquid level sensor 213 is detected and signaled to the user, and the remaining switch provides a high liquid level output signal which terminates the test cycle by closing valve 33 and signaling a pump failure by conditioning the associated status LED to a red indication. The functionality of valve monitoring circuit 230 can be most advantageously implemented within a microprocessor-based system such as those shown in FIGS. 1, 14, 23 and 27.

Figure 29:
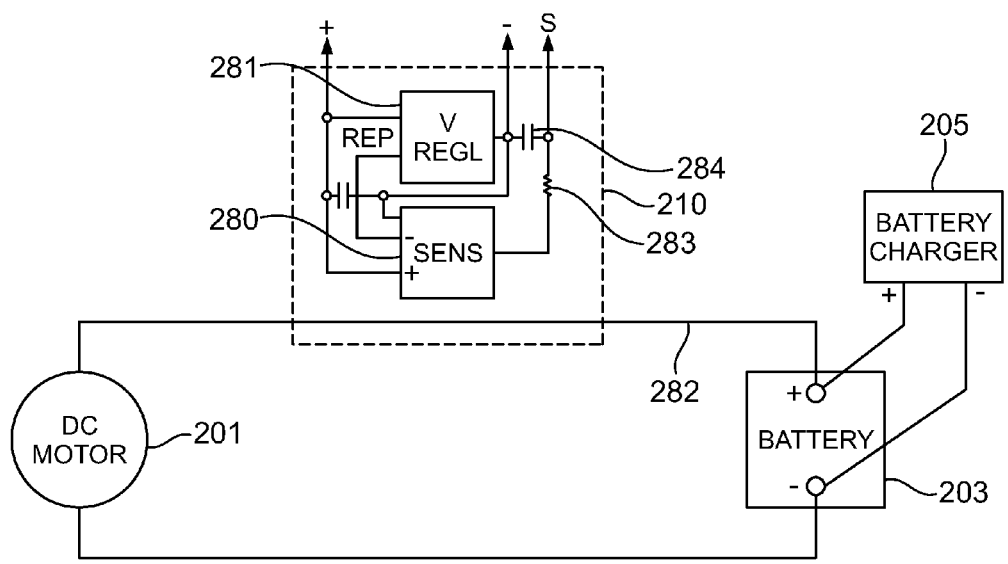
FIG. 29 is a simplified block diagram partially in schematic form of the current probe module shown in FIGS. 15 and 24.
Figure 30:
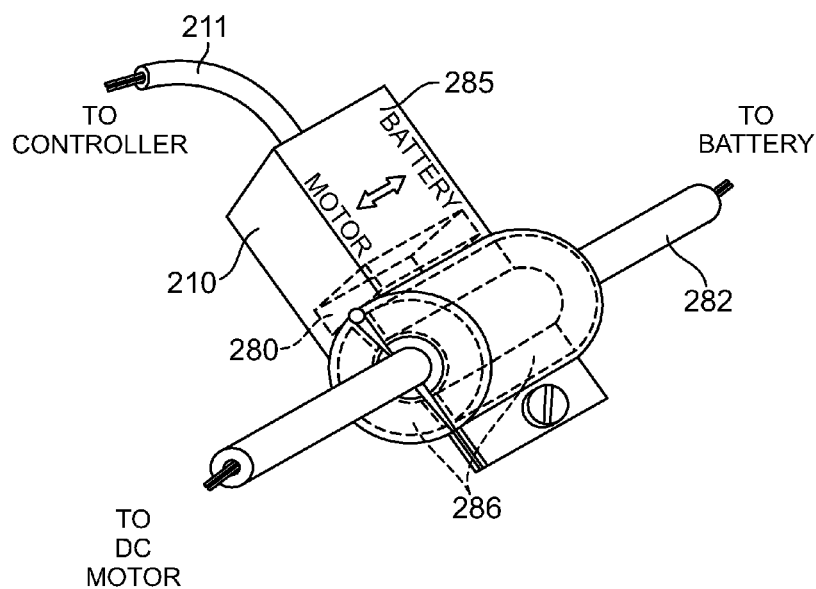
FIG. 30 is an enlarged perspective view of the housing of the current probe module shown in FIGS. 15, 24 and 29.

Referring to FIGS. 29 and 30, the current sensing probe module 210 utilizes a solid state current sensing element 280, such as a Hall Effect sensor IC, positioned in close proximity to one of the electrical conductors 282 in cable 204 supplying DC current from battery 208 to DC motor 201. The Hall Effect sensor responds to the magnetic field around the conductor, the magnitude and direction of the field being dependent on the magnitude and direction of current flow in the conductor. A regulated reference voltage developed by a conventional voltage regulator 281 is supplied to the sensor, which provides an analog output voltage either greater or lesser than the reference voltage, depending on the magnitude and direction of current flow in the conductor. The analog output voltage is filtered by a resistor 283 and a capacitor 284 and supplied through cable 211 (FIG. 15) to circuitry within control module 207. As shown in FIG. 30, the circuitry of probe 201 is preferably contained within a housing 285 which includes an internal toroidal magnetic element 286 that wraps around conductor 280 and includes two air gaps that facilitate installation on the conductor without disconnecting the conductor from battery 203. Sensing element 280 is positioned close to one of these gaps such that a portion of the magnetic flux surrounding the conductor is sensed by the sensing element.

Thus, a compact and easily removable probe is provided that can sense DC motor current as required to confirm operation of the battery-powered sump and provide a current-indicative signal to circuitry within the system controller.

Figure 31:
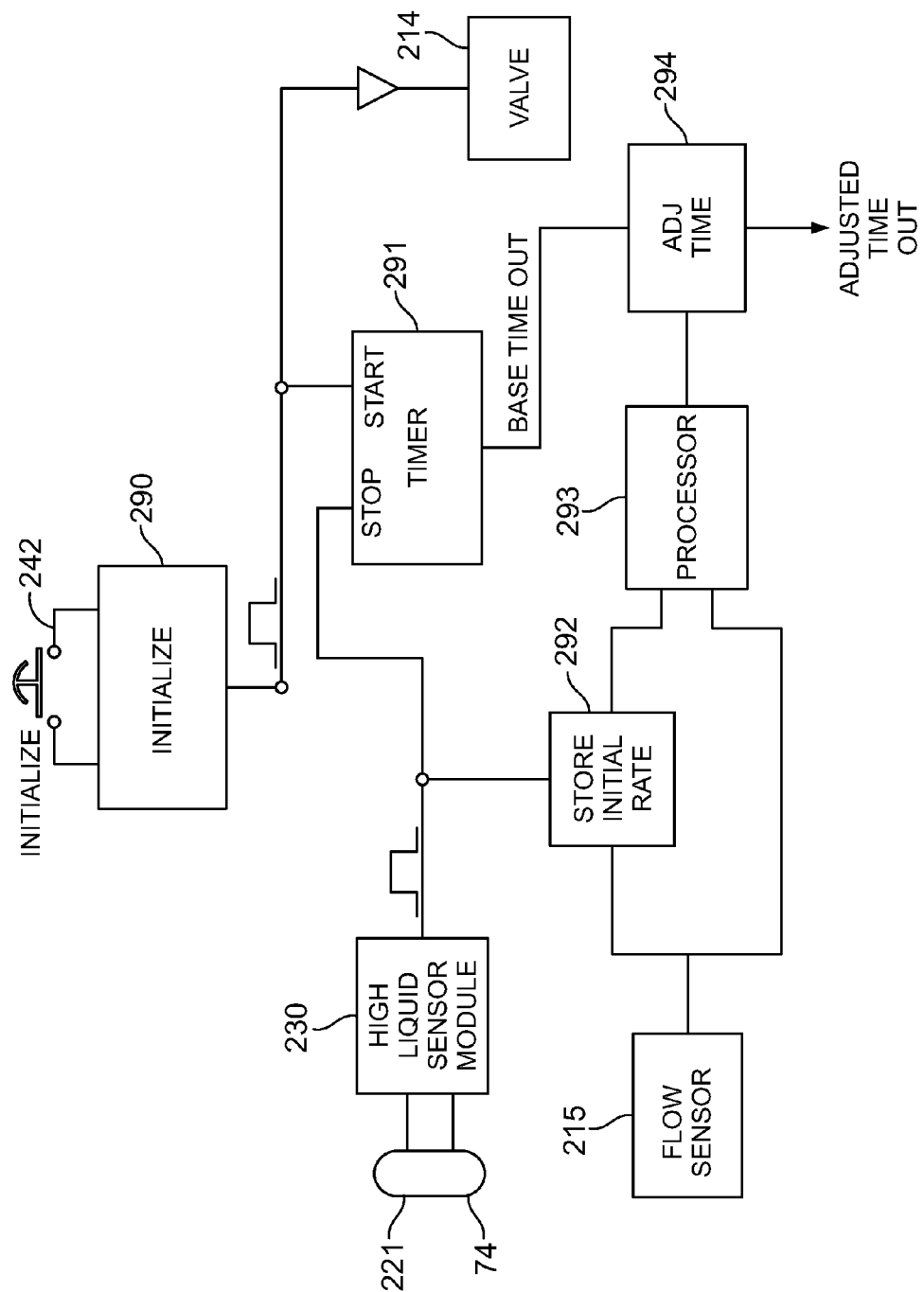
FIG. 31 is a simplified functional block diagram illustrating a system optionally incorporated in the sump pump test and monitoring systems of the disclosure for automatically adjusting the time out period of the pump test cycles in accordance with the actual flow rate of fresh water entering the sump container through the electrically-actuated valve module.

Referring to FIG. 31, the time out period for a test cycle can, in accordance with another aspect of the disclosure, can optionally be adjusted in accordance with the actual flow rate of fresh water into pump container 11 during a test cycle. To this end, with all sump pumps disconnected or otherwise disabled, and with no significant flow of ground water into the container, an initialize circuit 290 is actuated by momentary actuation of INITIALIZE push button switch 242. This causes valve 33 in valve module 214 to begin admitting water to the sump container and a timer 291 to be actuated. Timer 291 continues to run until stopped by an output signal from high liquid level sensing module 230. The elapsed time, as indicated by tinier 291, upon timer 291 stopping becomes the base fill time for the sump container.

During the same inflow period, flow sensor 215 provides an output signal indicating the then existing flow rate of fresh water into the sump container 11. This flow rate is stored in a memory component 292. During subsequent test periods this stored flow rate is compared with the actual flow rate by a processor 293 to obtain a flow correction factor, and from that factor a test time out correction factor is calculated. This time out correction factor is added to or subtracted from the base time out by a correction circuit 294 to obtain a corrected time out period for use in subsequent sump pump testing.

Use of the corrected time out period compensates for variations in the flow rate of fresh water into the sump container as might result from pressure variations in the fresh water supply. This can reduce the test cycle time out during periods of high water pressure and high fresh water flow rate, thereby reducing the time required for the test, and increase the test cycle time out during periods of low water pressure and low fresh water flow rate, thereby in extreme cases avoiding a false indication of pump failure from a premature time out, before the liquid level in the container has reached the actuating level of the pump under test. The functionality of the described variable time out circuit can be most advantageously implemented within a microprocessor-based system such as those shown in FIGS. 1, 14, 23 and 27.

Figure 32:
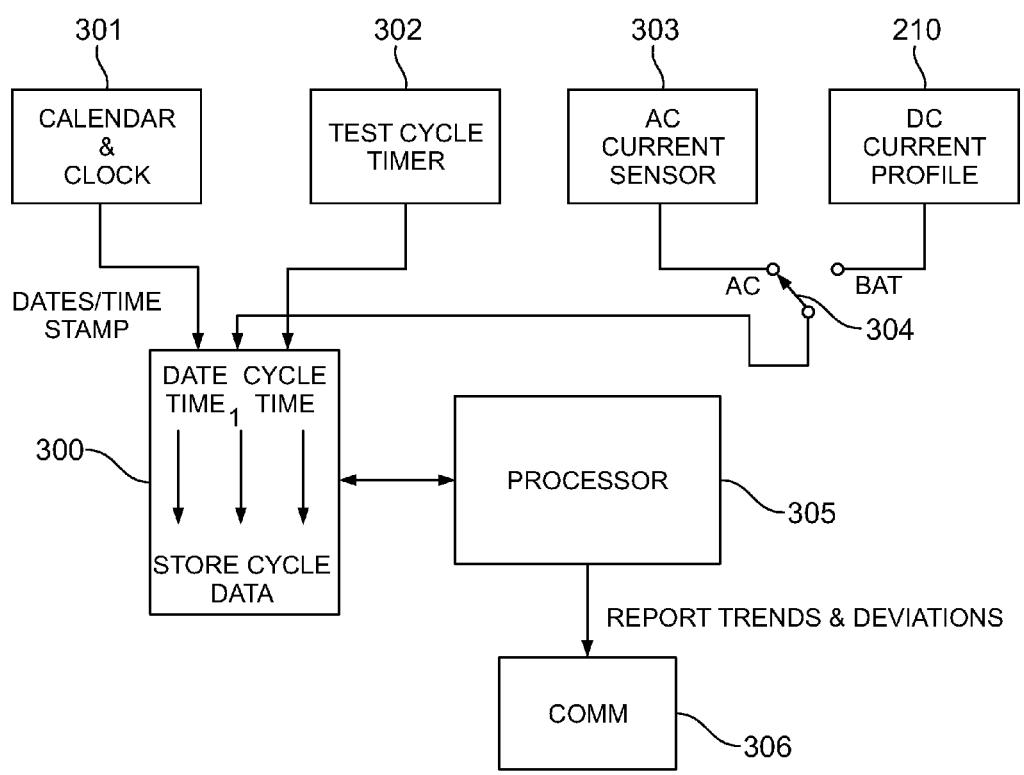
FIG. 32 is a simplified block diagram illustrating a system optionally incorporated in the sump pump test and monitoring systems of the disclosure for detecting and reporting trends and deviations in AC and battery-powered sump pump performance.

Referring to FIG. 32, in further accord with the present disclosure, previously described sump pump test and monitoring systems 200 and 250 can optionally track the performance of monitored sump pumps. In particular, a memory component 300 provided in the system control module can record for each test the date and time, as provided by an internal calendar component 301, the duration of the test cycle as provided by a tinier circuit 302, and the current supplied to the motor under test as provided by the internal AC sensor 303, in the case of an AC motor, or by the DC current probe module 210, as appropriately selected by an internal switch 304, in the case of a battery-powered DC motor.

Periodically, an internal processor 305, which can be the main control processor of the module, receives and processes the test information stored in memory component 300 and produces a report, which is conveyed over the existing communications channel 306 to the owner of the system and other owner-designated recipients, such as the owner's plumbing contractor. In this way, an impending failure of a monitored sump pump, as recognized by a longer elapsed run time, or by higher or lower motor current consumption, can be recognized and pre-emptive repair or replacement action can be taken. The functionality of the described trend monitoring and reporting system can be most advantageously implemented within a microprocessor-based system such as those shown in FIGS. 1, 14, 23 and 27.

Figure 33:
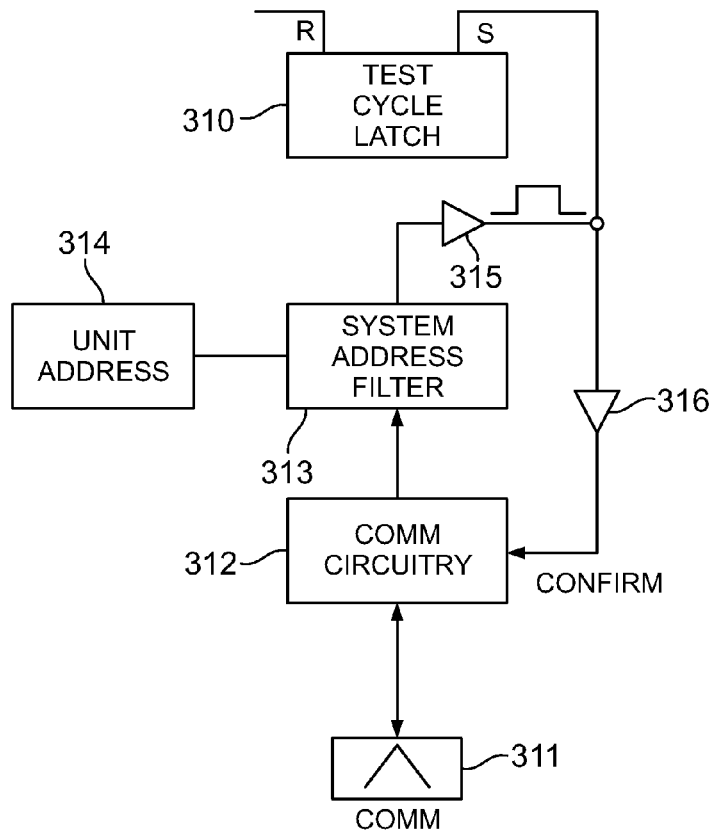
FIG. 33 is a simplified block diagram illustrating a system optionally incorporated in the sump pump test and monitoring systems of the disclosure for initiating a test cycle for one or more designated systems from a remote location by means of the bi-directional communications channel in such systems to facilitate selective testing in the event of imminent events, such as an approaching storm.

Referring to FIG. 33, in accordance with another aspect of the disclosure, the communication channel can be optionally utilized to initiate a test of the monitored sump pump installation in advance of an impending weather event. In particular, a control signal initiated from a central monitoring location, or alternatively a control signal automatically initiated by a computerized weather monitoring system, can, in reaction to a serious storm or other threat, address one or more sump pump test and monitoring systems in a selected threat region to initiate a test of the sump installations monitored by those systems.

To this end, a command signal is sent over the existing bi-directional communication channel 311 to communication circuitry 312 within the control modules of each addressed monitoring system. This command signal is conveyed through a system address filter 313, which compares the command signal with a stored unit address in a memory 314. If a match exists, the command signal is recognized and a control signal is applied through a conditioning pulse circuit 315 to condition test cycle latch 310 to a SET state, thereby starting a test cycle in the designated test and monitoring system.

Once the test cycle is initiated, the test continues until a result is obtained, which is conveyed back over the communications channel to the monitoring center and other owner-designated recipients in a conventional manner. Successful receipt of the test command can also be conveyed back to the originator by a signal conditioning circuit 316 if desired. Thus, extreme weather events involving heavy rainfall can be protected against by selective proactive testing of sump pump installations likely to experience the events. The functionality of the described remote activation system can be most advantageously implemented within a microprocessor-based system such as those shown in FIGS. 1, 14, 23 and 27.

Figure 34:
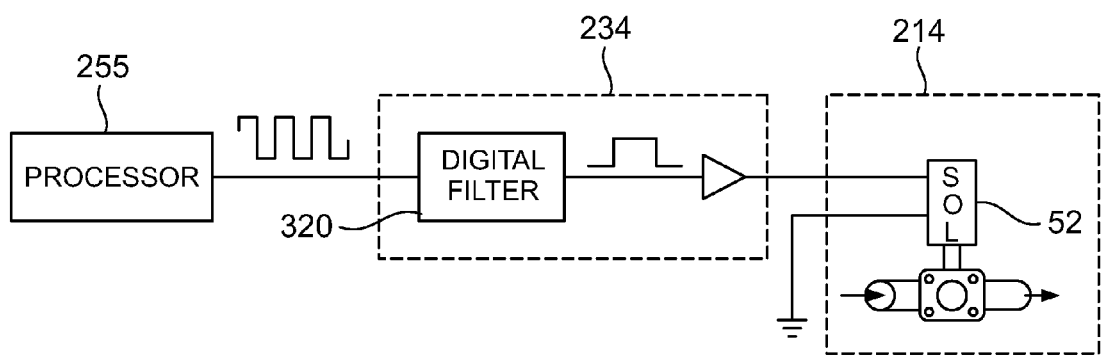
FIG. 34 is a functional block diagram partially in schematic form of a fail safe valve driver circuit optionally incorporated in the sump pump test and monitoring systems described in the present disclosure.

Referring to FIG. 34, to preclude the fresh water valve 33 from being actuated by a failure in processor 255, the sump pump test and monitoring systems previously described can, in accordance with another aspect of the disclosure, be optionally provided with a protection circuit 320. Utilizing this system, the valve actuating signal generated by the system processor for application to protective circuit 320 is, instead of a simple actuating signal, a square wave signal of predetermined frequency, or of some other complex waveform, possible only in the event of the processor operating normally.

This complex signal is analyzed by the protective circuitry and if determined to be of the correct format, converted to a steady state control signal which is applied to solenoid 52 to open valve 33. Thus, in the event of a malfunction in microprocessor 255, the requisite complex valve control signal will not be supplied to the protective circuit, and no actuating signal will be applied to valve module 33. Thus, valve protection circuit 320 functions to prevent valve 33 from being inadvertently actuated by a processor malfunction, thereby increasing the reliability of the system. The functionality of the described valve protection system can be most advantageously implemented within a microprocessor-based system such as those shown in FIGS. 1, 14, 23 and 27.

The foregoing detailed descriptions have been given for clearness of understanding only and no unnecessary limitations should be understood therefrom. It will be apparent to those skilled in the art, that changes and modifications may be made therein without departing from the invention in its broader aspects, and, therefore, the intent in the appended claims is to cover all such changes and modifications that fall within the true spirit and scope of the present disclosure.

What is claimed is:

1. An automated system for monitoring and testing a sump pump installation of the type having a liquid container, a motor driven pump which when powered discharges liquid from the container, and a switch circuit which supplies current to power the pump motor upon the liquid level in the container rising to a first predetermined level, the monitoring system comprising:
 a liquid conduit including an electrically-actuated valve which admits liquid into the liquid container in response to a valve control signal;
 a test control module which when actuated supplies a valve control signal to initiate a test cycle during which liquid is admitted to the container to cause the liquid level in the container to rise to at least the first predetermined level, to test the pump discharging of liquid from the container, said test control module supplies a valve control signal to stop the admittance of liquid upon a predetermined event terminating the test cycle;
 and wherein the test control module includes a timer circuit which, if the test cycle is not terminated upon occurrence of the predetermined event, terminates the test cycle and terminates application of the valve control signal to the valve after a predetermined time out period following initiation of the test cycle; and
 wherein the test control module further includes an indicator circuit which indicates upon termination of the test cycle whether the pump discharges from the container a portion of the liquid.

2. A test and monitoring system as defined in claim 1 wherein the timeout period of the test cycle is dependent on a flow rate of liquid through the conduit.

3. A test and monitoring system as defined in claim 2 wherein the system further includes a flow sensor providing an output signal indicative of the flow rate in the conduit, and a processor circuit configured to compute the timeout period using the output signal indicative of the flow rate, and a stored reference flow rate.

4. A test and monitoring system as defined in claim 1 wherein
 the monitoring system includes a high liquid level sensor which senses the liquid level in the container having risen above an operating level of the pump, and
 the test control module includes a user-actuated initialization circuit wherein when actuated, the sump pump is deactivated and the electrically-actuated valve is actuated to admit the liquid into the container until the liquid level in the container rises to actuate the high liquid level sensor, to determine a timeout period as an elapsed time from actuation of the valve to actuation of the high liquid level sensor, and determine a reference flow rate as a flow rate before actuation of the high liquid level sensor.

5. An automated system for testing and monitoring a sump pump installation of the type having a liquid container, a motor driven pump which following activation operates until subsequently deactivated by a predetermined control effect to pump liquid from the container, and a pump switch circuit which supplies current to the pump motor to activate the pump upon sensing the liquid level in the container having risen to a first predetermined level, the system comprising:
- a liquid conduit connected to an external liquid source and including an electrically-actuated valve which when open flows liquid from the external source into the container;
- a test control module which when actuated opens the electrically-actuated valve to initiate a test cycle during which liquid flows into the container to cause the liquid level therein to rise to at least the first predetermined level, after which the motor driven pump is activated to pump liquid from the container and the test control module closes the valve to terminate the flow of liquid into the container, the pump continuing to operate until occurrence of the predetermined control effect;
- wherein the test control module includes a timer circuit which, if the motor driven pump is not activated, terminates the test cycle and closes the valve after a predetermined time out period following initiation of the test cycle; and
- wherein the test control module further includes an indicator circuit which indicates a successful test upon deactivation of the pump.

6. An automated system for testing and monitoring a sump pump installation of the type having a liquid container, a motor driven pump which following activation operates until subsequently deactivated by a predetermined control effect to pump liquid from the container, and a pump switch circuit which activates the pump by supplying operating current to the pump motor upon sensing the liquid level in the container having risen to a first predetermined level, the system comprising:
- a liquid conduit connected to an external liquid source and including an electrically-actuated valve which opens to flow liquid from the external source into the container in response to an applied valve control signal;
- a test control module which when actuated applies a valve control signal to the electrically-actuated valve to open the valve to initiate a test cycle during which liquid flows into the container to cause the liquid level therein to rise to at least the first predetermined level, after which the pump switch circuit supplies current to the pump motor to activate the pump to pump liquid from the container, and the test control module closes the valve to terminate the flow of liquid into the container, the pump switch circuit continuing to supply current to the pump motor causing the pump to continue to operate until occurrence of the predetermined control effect;
- wherein the test control module includes a current sensor circuit sensing current supplied to the pump motor by the pump switch circuit;
- wherein the test control module includes a timer circuit which, if the motor driven pump is not activated, terminates the test cycle and closes the valve after a predetermined time out period following initiation of the test cycle; and
- wherein the test control module further includes an indicator circuit which, in response to the current sensor sensing the termination of current flow to the pump motor, indicates the occurrence of a successful test.

* * * * *